United States Patent [19]
Kusumoto et al.

[11] Patent Number: 5,740,505
[45] Date of Patent: Apr. 14, 1998

[54] IMAGE FORMING APPARATUS

[75] Inventors: Keiji Kusumoto; Katsuaki Tajima, both of Toyokawa, Japan

[73] Assignee: Minolta Co, Ltd., Osaka, Japan

[21] Appl. No.: 743,180

[22] Filed: Nov. 5, 1996

[30] Foreign Application Priority Data

Nov. 6, 1995 [JP] Japan .................................. 7-287158
Nov. 6, 1995 [JP] Japan .................................. 7-287162

[51] Int. Cl.$^6$ .................................................. G06G 21/00
[52] U.S. Cl. ................................................ 399/200; 399/196
[58] Field of Search .......................... 399/200, 196, 399/130

[56] References Cited

U.S. PATENT DOCUMENTS 5,600,429  2/1997  Kutsuwada ............................ 399/17

FOREIGN PATENT DOCUMENTS 3-79541   4/1991  Japan .
3-117973  5/1991  Japan .

Primary Examiner—R. L. Moses
Attorney, Agent, or Firm—Burns, Doane, Swecker & Mathis, LLP

[57] ABSTRACT

The present invention relates to image forming apparatuses such as copying machines, facsimile devices, and complexes thereof. When the image is produced as rotated by 90 degrees or 270 degrees by the rotary processing part 307 while the scanning speed of the original document is finely adjusted so as to be lowered, the control of the magnification is carried out so that the produced image will be contracted in the main direction and enlarged in the sub direction by an mount corresponding to the amount of adjustment made on the operating panel. On the other hand, when the scanning speed of the original document is adjusted to a higher level, the control of the magnification is carried out so that the output image may be enlarged in the main direction and contracted in the sub direction by an amount corresponding to the amount of adjustment to be made on the operating panel.

18 Claims, 20 Drawing Sheets

Fig.17
[WHEN USED AS COPYING MACHINE]
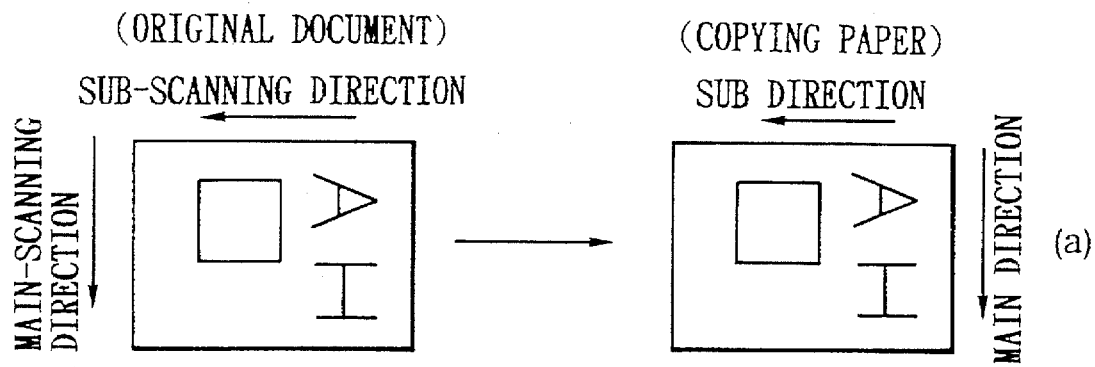
(a)
[WHEN IMAGE DATA FROM EXTERNAL DEVICE USED]
(IMAGES ON A COMPUTER)
(b)
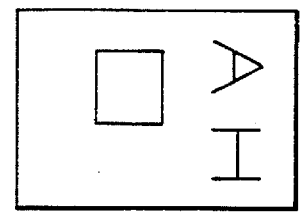
(c)
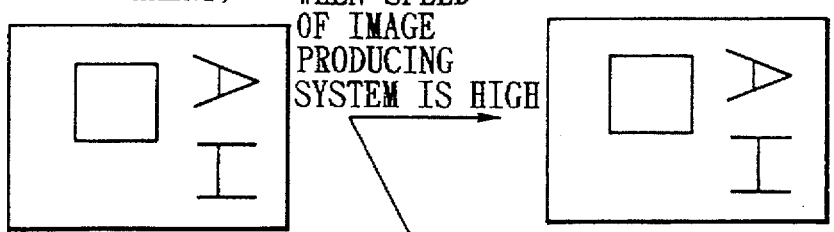
(d)
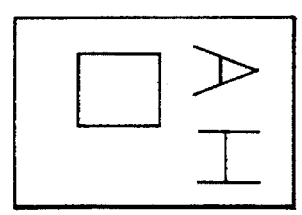
(e)

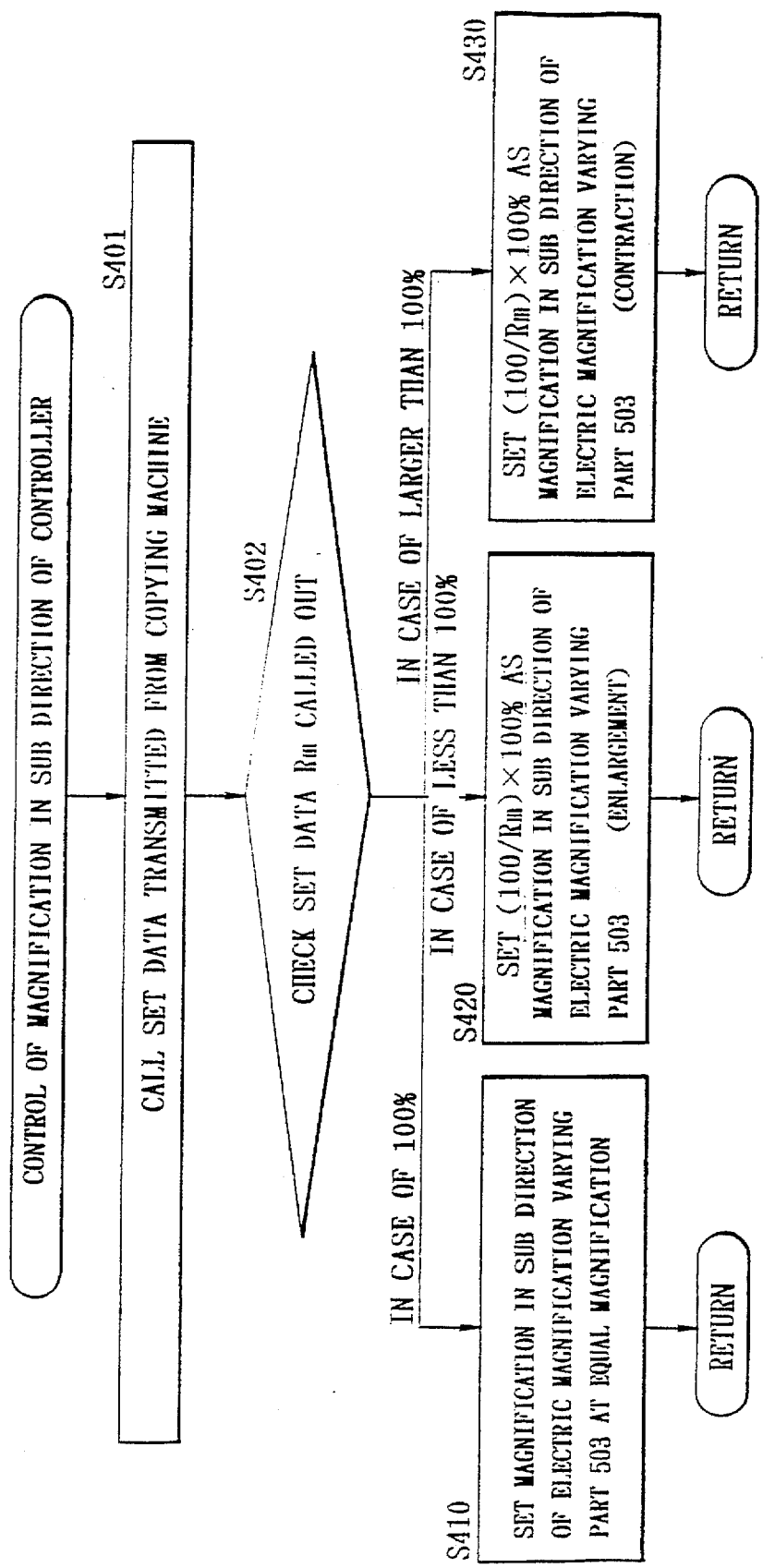

IMAGE FORMING APPARATUS

BACKGROUND OF THE INVENTION

1. Field of the Invention

This invention relates to image forming apparatuses such as copying machines, facsimile devices, and complexes thereof.

2. Description of the Related Art

Generally, in the image forming apparatuses such as copying machines, facsimile devices, and complexes thereof, the magnification of output image in the sub-scanning direction is largely affected by the scanning speed of an original document and the system speed of the image forming apparatus and, therefore, has many variable factors as compared with the magnification of output image in the main scanning direction. In due observance of those users who make a harsh demand on the magnification of output image, the practice of adjusting the magnification of output image in the sub-scanning direction for the purpose of preventing the deformation of an output image owing to the dispersion of the magnifications of output image in the two directions is now in vogue in the market. Generally, for the adjustment of a magnification of output image, the method which consists in relying on a serviceman or a user personally to make fine adjustment of the working speed of a scanner on an original document while monitoring an output image is adopted. As another method, the adjustment of the magnification of output image in the sub-scanning direction which is attained by adjusting the system speed of an image forming apparatus may be utilized.

According to the present inventors' study, however, it has been found that the fine adjustment of the magnification of output image mentioned above, when exclusively resorted to, entails the problem that the production of an image free from deformation at such an exact magnification of output image as is demanded by users is not attainable. It has been also found that this problem gains in prominence particularly in the digital type image forming apparatus which has been finding growing utility in recent years.

Firstly, JP-A-03-79,541 and JP-A-03-117,973, for example, have disclosed to the art such digital copying machines as are endowed with a rotational processing function of producing as an output the image of an original document as rotated by 90 degrees for the purpose of effecting electronic sortation or decreasing the margin of a recording paper to the fullest possible extent.

In the digital copying machines which are endowed with this rotational processing function, the fine adjustment of the operating speed of the scanner is performed on the assumption that the direction of the original document and that of the recording paper have a certain fixed relation, notwithstanding these two directions are not always identical. The conventional digital copying machine mentioned above, therefore, entails the following problem. When the image obtained by reading an original document while the speed (system speed) of the image producing device happens to deviate from the standard level set as a target and the original document scanning speed of the scanner is finely adjusted by way of compensation for the deviation is rotated by 90 degrees or 270 degrees, the image finally obtained as an output shows a discrepancy in the magnification between the longitudinal and the lateral direction. The patent publication barely describes the function of rotating the image by 90 degrees and has absolutely no mention of this problematic point.

Secondly, the digital copying machine which is provided with an interface for union with such an external device as a computer and consequently enabled to produce an image as an output based on image data transmitted from the external device has been known in the art.

In the digital copying machine of such a type as is provided with the interface for union with the external device, the discrepancy in the magnification of output image between the main scanning direction and the sub-scanning direction cannot be eliminated even by adjusting the scanning speed produced by the scanner relative to the original document because the image data is directly transmitted from the external device different from the scanner when the image is produced based on the image data introduced from the external device. As a result, this digital copying machine is at a disadvantage in suffering the deviation of the speed in the image producing device to manifest directly in the produced image.

SUMMARY OF THE INVENTION

An object of this invention is to provide a novel and useful image forming apparatus which is free from the problems mentioned above.

Another object of this invention is to provide an image forming apparatus which is capable of producing an image exactly at a prescribed magnification of output image without being deformed.

Still another object of this invention is to provide an image forming apparatus which avoids producing a discrepancy in the magnification of a produced image between the longitudinal and the lateral direction even when the image of an original document produced while the scanning speed relative to the original document is in a finely adjusted state is rotated by 90 degrees or 270 degrees by making use of the function of memory.

Yet another object of this invention is to provide an image forming apparatus which is made to avoid producing a discrepancy in the magnification of output image of an image between the main scanning direction and the sub-scanning direction even when the image represented by image data introduced from an external device is produced as an output while the speed of the image producing device deviates from the standard level set as a target.

To accomplish the objects mentioned above, the image forming apparatus according to the first aspect of this invention comprises an image reader which reads an original document and produces an image data according to the original document, an image reproducer which reproduces an image corresponding to the image data produced by the image reader, an image rotator for processing the image data produced by the image reader so that an image represented by the image data is rotated by 90 degrees or 270 degrees, and a corrector which corrects a magnification of an image to be reproduced by the image reproducer when the image rotator processes the image rotation.

To accomplish the objects mentioned above, the image forming apparatus according to the second aspect of this invention comprises an image reader which reads an original document and produces an image data according to the original document, an interface for introducing an image data from an external device, an image reproducer which reproduces an image selectively corresponding to the image data produced by the image reader or the image data introduced from the external device, and a corrector which corrects a magnification of an image represented by the image data introduced from the external device.

Further, to accomplish the objects mentioned above, the image forming apparatus according to the third aspect of this invention comprises an image reader which reads an original document and produces an image data according to the original document, an interface for receiving data from and transmitting data to an external device, an image reproducer which reproduced an image selectively corresponding to the image data produced by the image reader or the image data received from the external device, and a transmitter for transmitting a data concerning the magnification to the external device trough the interface before receiving the image data from the external device.

The invention will be better understood and objects, advantages, and features thereof other than those set forth above will become apparent from the following detailed description, which makes reference to the accompanying drawings illustrating specific embodiments of the invention.

BRIEF DESCRIPTION OF THE DRAWINGS

In the following description, like parts are denoted by like reference numerals throughout the several drawings.

FIG. 17 consists of a diagram (a) illustrating an original document and an image which are involved when the image is produced as an output by a scanner reading the original document and diagrams (b)–(e) illustrating images on a computer and output images obtained as outputs from image data introduced from an external computer.

FIG. 20 is a flow chart illustrating one example of the sub-routine for setting the magnification in the sub direction to be executed by the external device side control in the other embodiment mentioned above.

DESCRIPTION OF THE PREFERRED EMBODIMENTS

Embodiment 1

<Whole construction>

Figure 1:
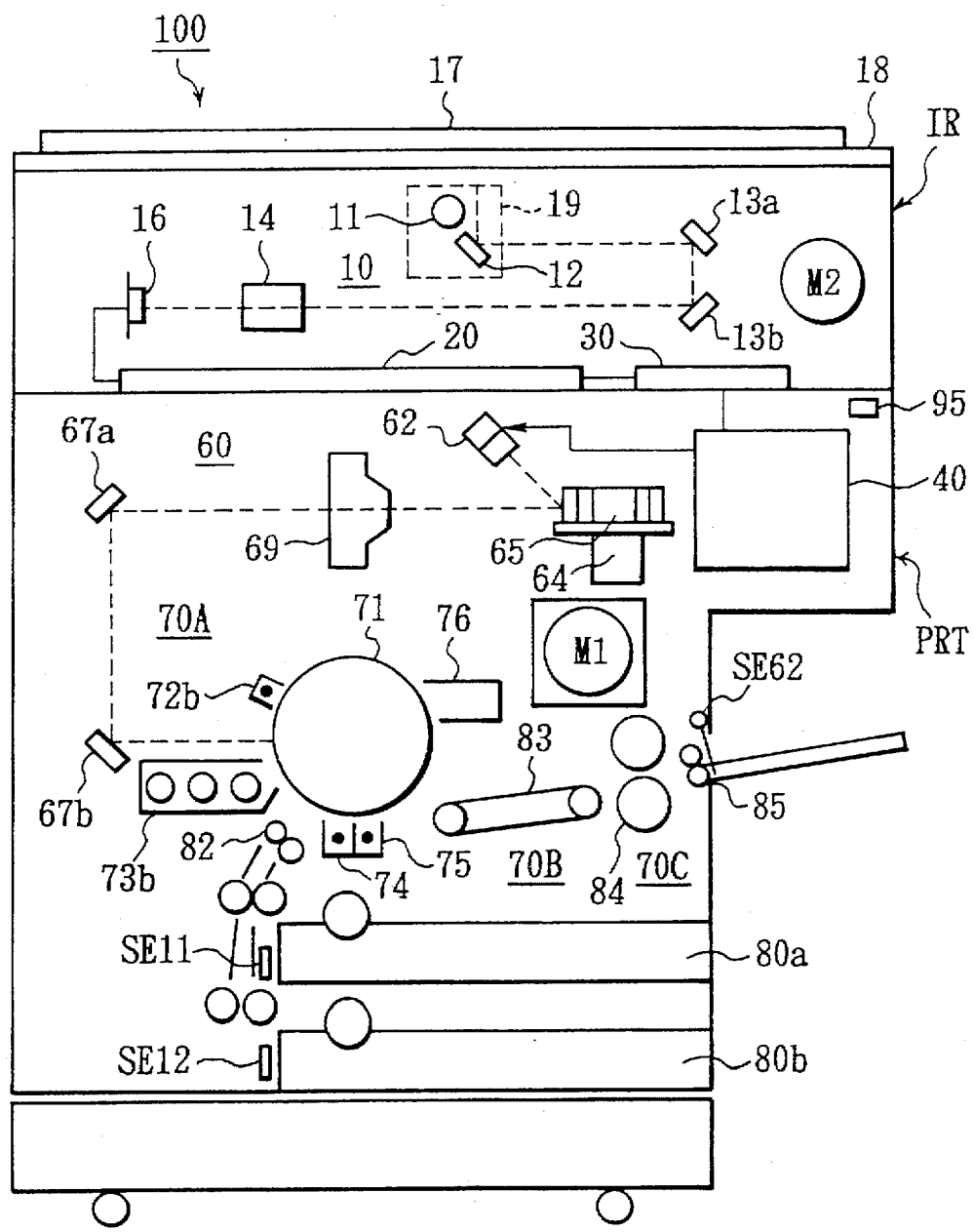
FIG. 1 is a longitudinal section illustrating the whole construction of a digital copying machine as one embodiment of the present invention.

FIG. 1 is a longitudinal section illustrating the whole construction of a digital copying machine 100 according to one embodiment of this invention. This digital copying machine 100 is provided with a reading device IR and a printer device PRT. The reading device IR is provided with a scanning system 10, an image signal processing part 20, and a memory unit part 30. The printer device PRT is provided with a print processing part 40, a print optical system 60, and an image producing system, i.e. a developing transfer system 70A, a conveying system 70B, and a fixing system 70C. The digital copying machine 100 is provided on the upper surface thereof with an operating panel (not shown) formed of an LCD (liquid crystal display), which is provided so as to permit manipulation of various keys disposed on the operating panel.

The scanning system 10 in the reading device IR is composed of a scanner 19, an exposure lamp 11 incorporated in the scanner 19, a first mirror 12, second and third mirrors 13a, 13b, a condenser lens 14, a CCD (charge coupled device) 16 as a photoelectric converting element, and a scanner motor M2 for moving the scanner 19 in the horizontal direction below an original document glass 18 (the direction of motion of the scanner 19 constituting a "sub-scanning direction"). Owing to this construction, an original document set in place on the original document glass 18 is read out by exposure and scanning and the data of original document thus read out is forwarded to the image signal processing part 20.

The image signal processing part 20 processes the data of original document, that is, the image signal emitted from the CCD 16 and, at the same time, detects the size of the original document, and emits the image data as an output to the memory unit part 30. The memory unit part 30 memorizes the image data and, at the same time, processes it to effect rotation of the image. Thereafter, the image data is transferred to the print processing part 40 of the printer device. The image signal processing part 20 and the memory unit part 30 will be described in detail herein below.

The print processing part 40 generates a drive signal for driving a semiconductor laser based on the incoming image data and supplies the drive signal to the print optical system 60. The print optical system 60 is composed of a semiconductor laser 62 for emitting a laser beam in response to the drive signal, a polygon mirror 65 for polarizing the laser beam, a drive part 64 for the polygon mirror 65, a main lens 69, and reflecting mirrors 67a and 67b. It is by this print optical system 60 that the laser beam representing the image of the original document is formed and transferred to the image producing system.

The image producing system is provided with a main motor M1 as the drive source of various drive parts of the developing transfer system 70A, the conveying system 70B, and the fixing system 70C. The developing transfer system 70A is composed of a photosensitive drum 71 rotated counterclockwise in the bearings of FIG. 1, and an electric charger 72b, a developing device 73b, a transfer charger 74, a separating charger 75, and a cleaning part 76 which are disposed around the photosensitive drum 71 sequentially in the direction of rotation thereof from the upstream side. In the developing transfer system 70A, an electrostatic latent image corresponding to the image of the original document is formed on the photosensitive drum 71 by the laser beam from the print optical system 60 and a two-component developer composed of a toner and a carrier is supplied from the developing device 73b to the latent image. As a result, the toner is deposited in conformity with the electrostatic latent image on the photosensitive drum 71. The toner is transferred onto a paper supplied from the conveying system 70B. The paper consequently bearing the transferred toner image is separated from the photosensitive drum 71. To prepare the photosensitive drum 71 for the next round of the image producing operation, the cleaning part 76 cleans the surface of the photosensitive drum 71 to remove the toner particles remaining thereon.

The conveying system 70B is provided with cassettes 80a and 80b for holding stacks of papers, sensors SE11 and SE12 for detecting the sizes of papers, a timing roller 82, and a conveyor belt 83. It supplies papers to the developing transfer system 70A.

The fixing system 70C is provided with a fixing roller 84 for thermally fixing the toner image borne on the paper while conveying the paper forward, a discharge roller 85, and a discharge sensor SE62 for detecting the discharge of the paper now bearing the fixed toner image.

<Construction of controlling part>

Figure 2:
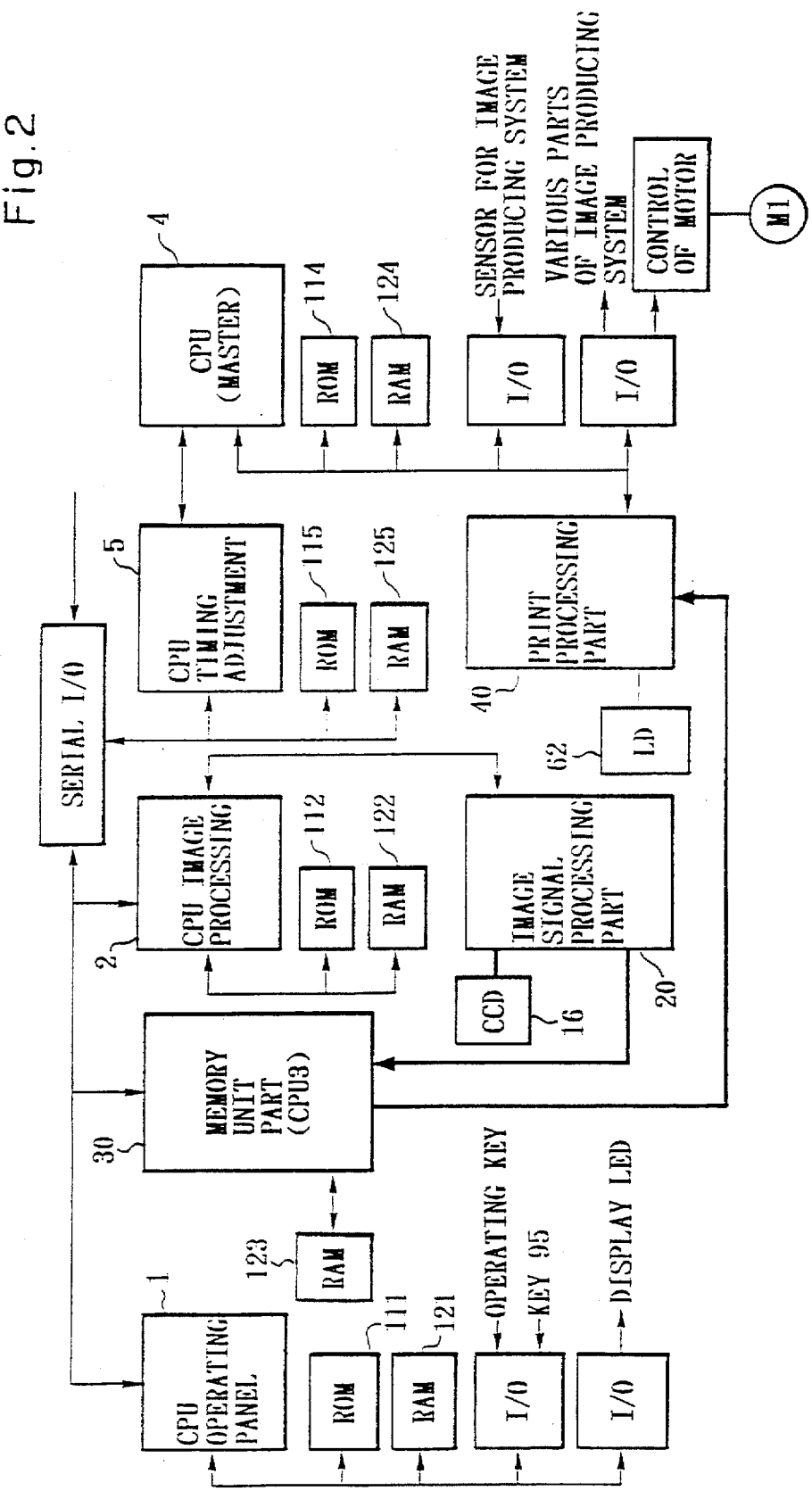
FIG. 2 is a block diagram illustrating the construction of a controlling part.

FIG. 2 is a block diagram illustrating the construction of the part responsible for controlling the operation of the digital copying machine 100 mentioned above (hereinafter referred to as "controlling part"). In the diagram, the component elements already referred to above will be denoted by like reference numerals.

This controlling part is constructed with five CPU's (central processing units) 1–5 as core components and is provided with ROM's (read only memories) 111, 112, 114, 115 severally storing the programs of the CUP's and RAM's (random access memories) 121–125 serving as working areas during the execution of the programs. The CPU 3 is provided in the memory unit part 30.

The CPU's 1–5 mentioned above have the following roles to discharge. The CPU 1 effects controls concerning the input and display of signals originating in various key manipulations on the operating panel (not shown). The CPU 2 controls the component parts of the image signal processing part 20, controls the drive of the scanning system, and controls the main motor M1 as the drive source of the image producing system. The CPU 3, by controlling the memory unit part 30, effects provisional storage of the read image data in the memory and subsequently reads out the image data and issues the image data to the print processing part 40. The CPU 4 controls the print processing part 40, the print optical system, and the image producing system. The signals from the paper size detecting sensors SE11 and SE12 are injected into the I/O which is managed by the CPU 4. The sizes of copying papers are also managed by the CPU 4. The CPU 5 performs such processings as are necessary for the adjustment of overall timing of the controlling part and for the setting of operating modes.

<Control and operation of scanning system and image signal processing part>

Figure 3:
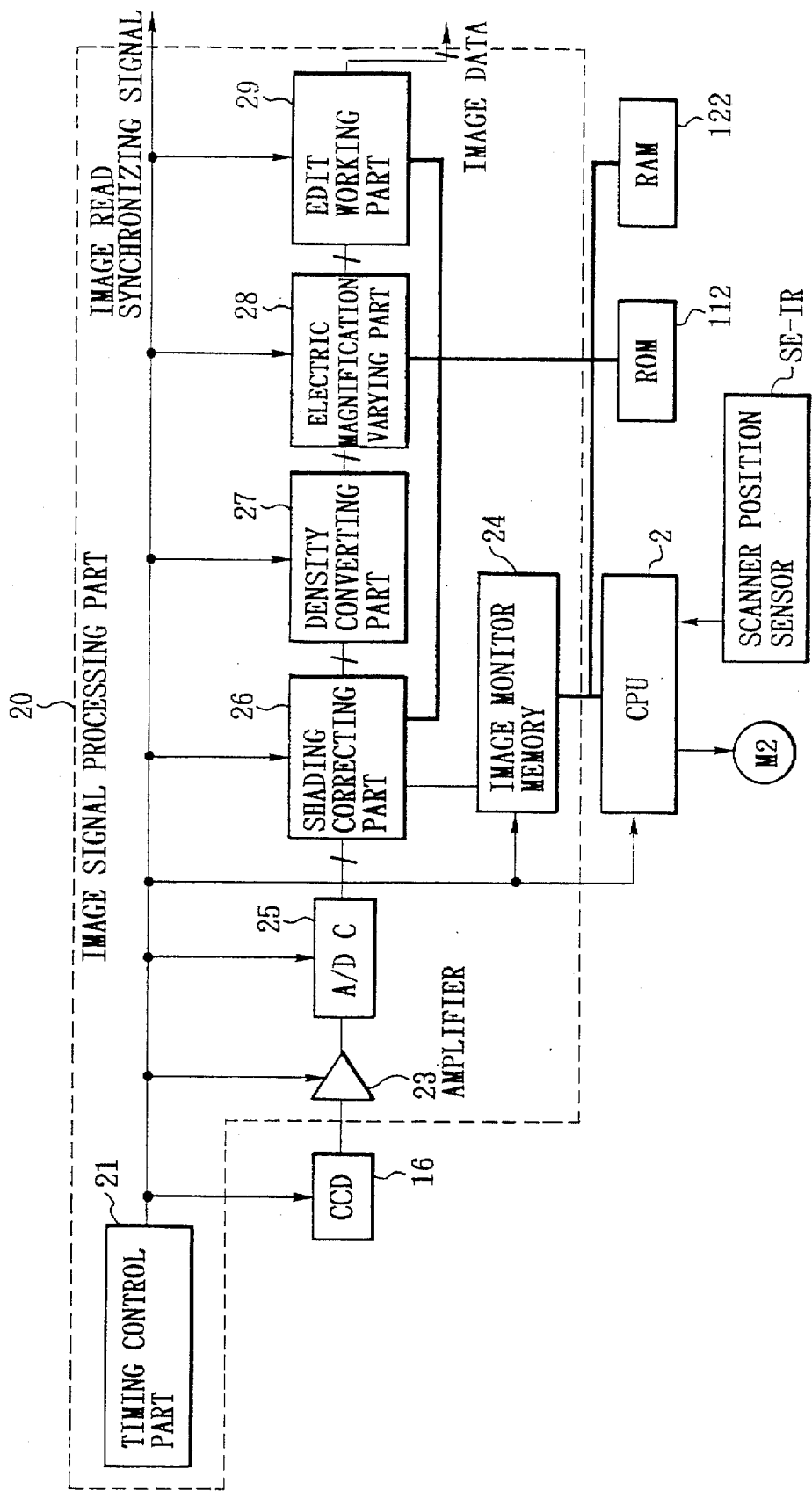
FIG. 3 is a block diagram illustrating the construction of a scanning system and an image signal processing part.

FIG. 3 is a block diagram illustrating the construction of the scanning system and the image signal processing part 20. Now, the control and the operation of the scanning system and the image signal processing part 20 will be described below with reference to this diagram. The image signal processing part 20 is provided with a timing control part 21 and is enabled by this timing control part 21 to supply an image read synchronizing signal to the relevant blocks. The CCD 16 in the scanning system operates on the basis of the synchronizing signal and generates an electric signal by photoelectrically converting the image of an original document. This electric signal, that is, the image signal of the original document is sequentially processed by the component parts disposed in the image signal processing part 20 as follows. The image signal formed in the CCD 16 is first amplified by an amplifier 23 and then converted into 8 bit digital signal by an AD converter 25. In a shading correcting part 26, the digital signal is corrected to be deprived of the distortion caused by the optical system and the CCD 16. Then, it is processed in a density converting part 27 for the conversion of reflection data to density data and the gamma correction. The image signal resulting from this processing is introduced into an electric magnification varying part 28 and subjected to an electrical processing for change of magnification based on the data of a prescribed magnification. Subsequently, an edit working part 29 performs a processing for compiling an image on the image data represented by the image signal. The image data resulting from the editing is supplied to the memory unit part 30.

In preparation for the operation of the image signal processing part 20, the CPU 2 sets relevant parameters in the component parts 26–29 mentioned above. One scanning line of the image data is memorized in an image monitor memory 24 which is provided in the image signal processing part 20. Further, the CPU 2 also performs such works as controlling the scanner motor M2 and exchanging communications with the CPU 5.

In the present digital copying machine, the scanning system detects the size of the original document and determines the question of whether the original document is placed after the fashion of a landscape or that of a portrait. At this time, the CPU 2 operates as follows. The command to perform the detection of the size of the original document is issued from the CPU 5. The CPU 2 carries out a preliminary scanning in response to this command. Specifically, the CPU 2 controls the scanner motor M2 based on the data on the scanner position from the scanner position sensor SE-IR and causes the scanner 19 to scan the original document in the sub-scanning direction. Then, at a timing appropriate for the sub-scanning position and on the basis of the content of the image data and the data on the scanner position, the CPU 2 detects the size of the original document and determines the question of whether the original document is placed after the fashion of a portrait or that of a landscape and forward the results of the detection to the CPU 5.

In preparation for the work of reading the original document, the CPU 2 receives the data of magnification from the CPU 5 and controls the speed of the scanner motor M2 so that the scanning speed produced thereby will be in accordance with the data of magnification.

<Control and operation of memory unit>

Figure 4:
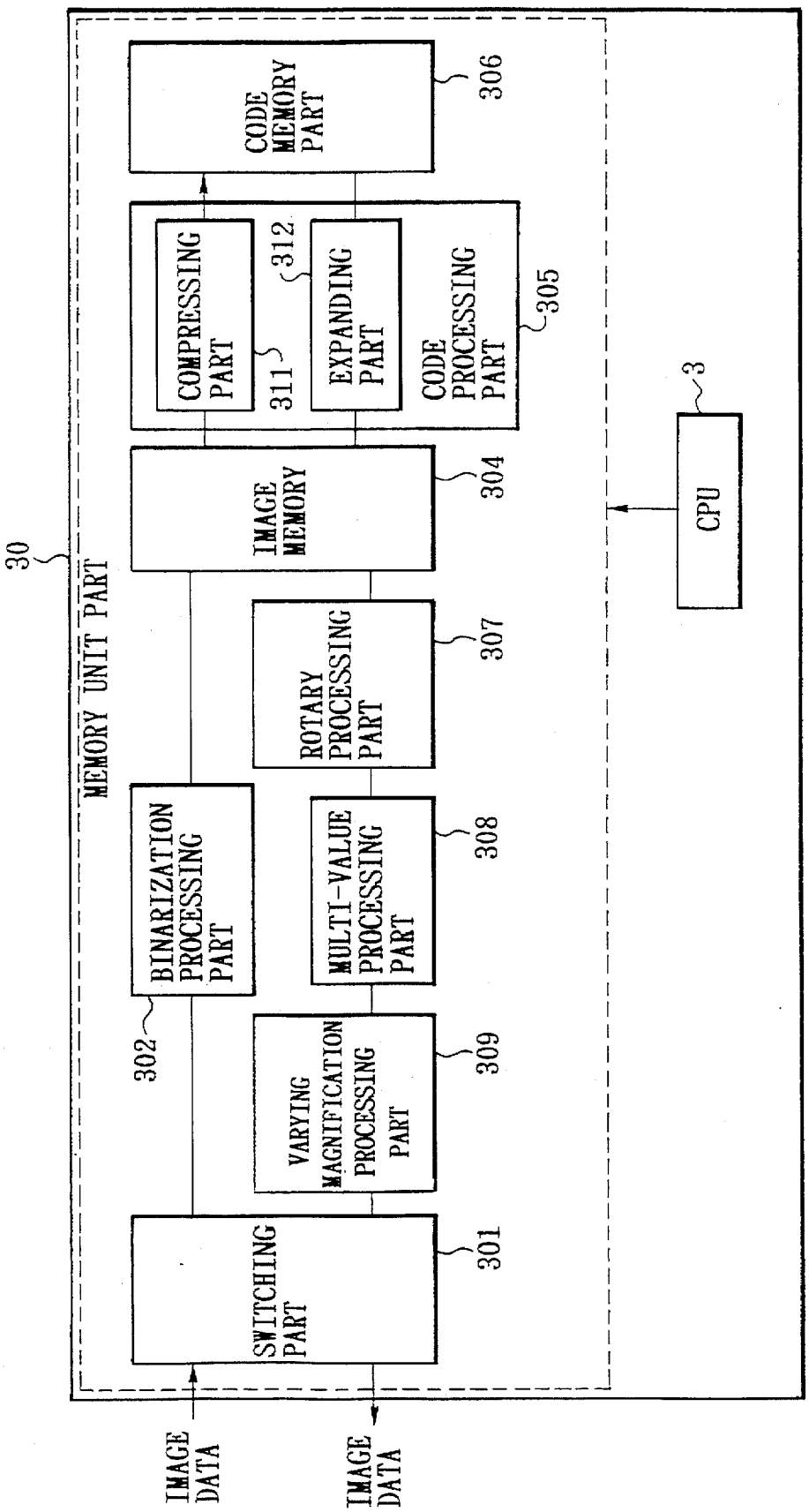
FIG. 4 is a block diagram illustrating the construction of a memory unit part.

FIG. 4 is a block diagram illustrating the inner construction of the memory unit part 30. The memory unit part 30 is composed of the CPU 3 for controlling the whole of the memory unit part 30, a switching part 301, a binarization processing part 302 for binarizing the image signal from the image signal processing part 20 based on the parameter set by the CPU 3, a multi-port image memory 304 having a prescribed capacity (two pages of original document of A4 size, containing images at a density of 400 dpi, for example), a code processing part 305 consisting of a compressing device 311 and an expanding device 312 which are operable independently of each other, code memory 306 having a multi-port, a rotary processing part 307, a multi-value processing part 308 for forming multi-value data based on the parameter set by the CPU 3, a varying magnification processing part 309, and the like.

In the construction described above, the code processing part 305, when the image data binarized by the binarization processing part 302 is written in the image memory 304, reads out the binary image data, contracts the data, and writes the code data obtained by the contraction into the code memory 306. This code processing part 305, in response to the command from the CPU 3, reads the code data written in the code memory 306, elongates the code data, and writes the binary image data produced by the elongation into the image memory 304.

After the elongation has allowed accumulation of one page full of binarized image data in the image memory 304, the CPU 3 reads the binarized image data from the image memory 304 and supplies it to the rotary processing part 307. The binarized image data supplied to the rotary processing part 307, when necessary, is given such a processing as is required for the purpose of rotating the image represented by the binarized image data and then subjected to multi-value conversion by the multi-value processing part 308. The multi-value image data obtained consequently is supplied to the varying magnification processing part 309. The varying magnification processing part 309 which is capable of effecting change of magnification in both the main direction and the sub direction carries out the varying magnification processing based on the magnification set by the CPU 3. The term "main direction" as used herein refers to the direction perpendicular to the direction in which the paper bearing the transferred output image is discharged and the term "sub direction" to the direction of the discharge. Generally, the main direction coincides with the main scanning direction and the sub direction coincides with the sub-scanning direction. The image signal emitted from the varying magnification processing part 309 is transferred via the switching part 301 to the print processing part 40 in the printer device.

<Fine adjustment of magnification of output image>

The scanning speed of the scanner 19 of the reading device, the scanning speed of the print optical system 60, the driving speed of the main motor M1 of the image producing system, and the speed of the timing roller 82 affect the magnification of output image in the sub-scanning direction in the digital copying machine 100. It is in the speed of paper feeding and the speeds of rotary drive of such devices as the photosensitive drum 71, among other speeds enumerated above, that errors are liable to occur. These components normally pose no serious problem, because they are so managed and incorporated in the digital copying machine as to operate at prescribed speeds with prescribed degrees of accuracy. Since the speeds and degrees of accuracy mentioned above are prone to dispersion, however, the digital copying machine requires adjustment of the magnification of output image in the sub-scanning direction to be saleable to a user who places a harsh demand on magnification. In this case, since it is difficult to adjust the individual speeds to the levels set as targets, the practice of finely adjusting the scanning speed of the scanner 19 while monitoring output images produced meanwhile thereby equalizing the magnification in the sub-scanning direction and the magnification in the main scanning direction is employed. As a result, the magnifications of output image in the longitudinal and lateral directions can be adjusted so long as the image on an original document is produced as an output in the same direction wherein the original document is set in plate on the original document glass 18.

Figure 5:
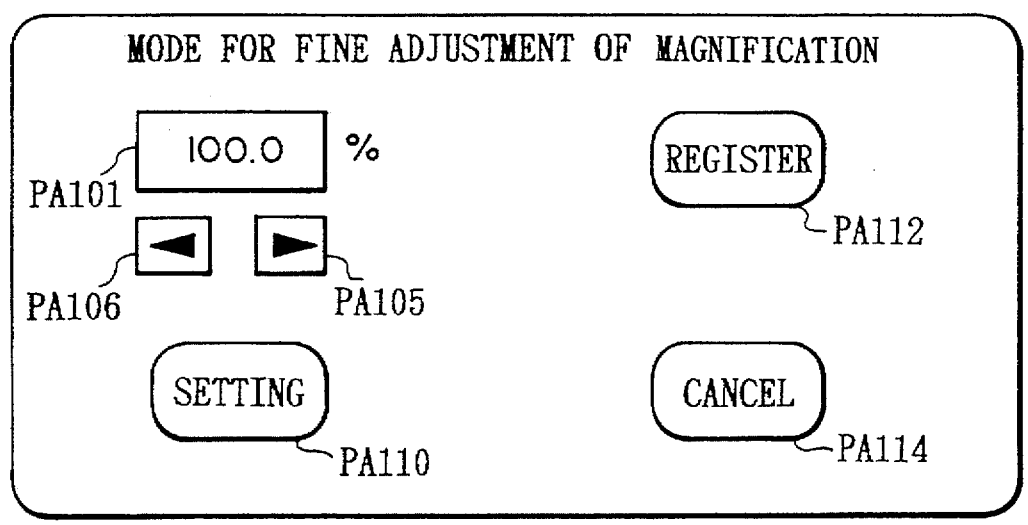
FIG. 5 is a diagram illustrating the display screen of an operating panel in the mode of fine adjustment of magnification.

FIG. 5 represents a display screen produced on the operating panel (the operating panel formed of an LCD as mentioned above) during the fine adjustment of the scanner 19 mentioned above. In FIG. 5, an area PA 101 is a part for displaying the scanning speed by percentage, an area PA 105 and an area PA 106 are parts for operating buttons used for setting an increase and a decrease in the speed, an area PA 110 is a part for a setting button to be manipulated in altering the magnitude of a set speed, an area PA 112 is a part for a register button for registering the content of setting, and an area PA 114 is a part for a cancel button for cancelling the altered magnitude.

The screen mentioned above is not displayed while the coping machine 100 is in the state of normal service but is displayed only when the operating panel is operated so as to be shifted to the mode of fine adjustment of magnification for the adjustment of the magnification of output image. This shift to the mode of fine adjustment of magnification is attained only when the mode for maintenance ("serviceman mode") is selected in the present embodiment. Incidentally, the shift from the normal mode to the serviceman mode is effected by manipulating the specific key 95 (FIG. 1).

<Operation in the mode of fine adjustment of magnification>

Now, the operation of the digital copying machine of the present embodiment in the mode of fine adjustment of magnification will be described below.

First, the processing for the manipulation of the keys on the operating panel in the mode of fine adjustment of magnification will be explained. This processing for the manipulation of keys is carried out by the CPU 1. The CPU 1 operates as shown in the flow chart of FIG. 6.

When the mode of fine adjustment of magnification is initiated, the state of the operating panel is detected at a step S101. The processing of this flow chart is terminated when the absence of the operation through the medium of the operating panel is confirmed at the step S101.

When the depression of the area PA 110 of the setting button (FIG. 5) is confirmed at the step S101, the processing is advanced to a step S110. At the step S110, the data which represents the existing magnitude of the set magnification of output image (hereinafter referred to as "the data of the set magnitude") is called out of the memory. At a next step S112, the question of whether or not the area PA 106 (FIG. 5) of the button for decreasing the set magnitude has been depressed is judged. When the absence of the depression of the area PA 106 is confirmed, the processing directly advances to a step S115. When the presence of the depression of the area PA 106 is confirmed, the data of the set magnitude is altered to decrease the set magnitude at the step S112 and the processing advances to the step S115. At the step S115, the question of whether or not the area PA 105 (FIG. 5) of the button for increasing the set magnitude has been depressed is judged. When the absence of the depression is confirmed, the processing directly advances to a step S120. When the presence of the depression is confirmed, the data of the set magnitude is altered to increase the set magnitude at a step S116 and the processing advances to the step S120. At the step S120, the magnitude represented by the data of set magnitude is displayed in the area PA 101 (FIG. 5). Then, the data of the set magnitude is stored in the memory to complete the processing of the flow chart.

When the depression of the area PA 112 (FIG. 5) of the register button is confirmed at the step S101, the processing advances to a step S130. At the step S130, the data of the set magnitude stored in the memory is registered. Then, the data of the set magnitude is transmitted to other CPU's at a next step S131. Subsequently, the display screen of the operating panel is returned from the screen of the mode of fine adjustment of magnification (FIG. 5) to the standard screen to complete the processing of the present flow chart. During the subsequent reading of the original document, the CPU 2 controls the speed of the scanner motor M2 to produce a scanning speed appropriate for the data of the set magnitude.

When the presence of the depression of the area PA 114 of the cancel button (FIG. 5) is confirmed at the step S101, the processing proceeds to a step S140. At the step S140, the data of the set magnitude stored in the memory is altered to return the set magnitude to "100%", that is, the standard magnitude. At a next step S141, the magnitude of the data of set magnitude, that is, "100%" is displayed on the screen of the operating panel. Subsequently, the display screen of the operating panel is returned from the screen of the mode of fine adjustment of magnification (FIG. 5) to the standard screen at a step S142 to complete the processing of the present flow chart.

Now, the processing for the control of the magnification of output image in the mode of fine adjustment of magnification will be described below. This processing is carried out by the CPU 3 which controls the memory unit part 30. At this time, the CPU 3 operates as illustrated in the flow chart of FIG. 7.

When the mode of fine adjustment of magnification is initiated, the question of whether or not the mode requires the image to be rotated by 90 degrees or 270 degrees is judged at a step S201. The mode which requires the image to be rotated by 90 degrees or 270 degrees is used when the copying papers are alternately discharged by the electronic sorting function and when the production of the image in a rotated state proves advantageous for the economization of papers, for example. It is also used when the rotation of the image by 90 degrees or 270 degrees is found advantageous in the light of the result of the conventional processing for recognition of the upper and lower sides of characters. In the mode requiring the image to be rotated by 90 degrees or 270 degrees, unlike in the normal mode, the main direction coincides with the sub-scanning direction and the sub direction coincides with the main scanning direction.

When the mode is not confirmed to be the one requiring the rotation by 90 degrees or 270 degrees at the step S201, the processing advances to a step S210 and sets therein the data of equal magnification as the set magnitudes of the magnifications in the main direction and the sub direction for the varying magnification processing part 309 in the memory unit part 30. Then, the processing of the present flow chart is completed.

Figure 6:
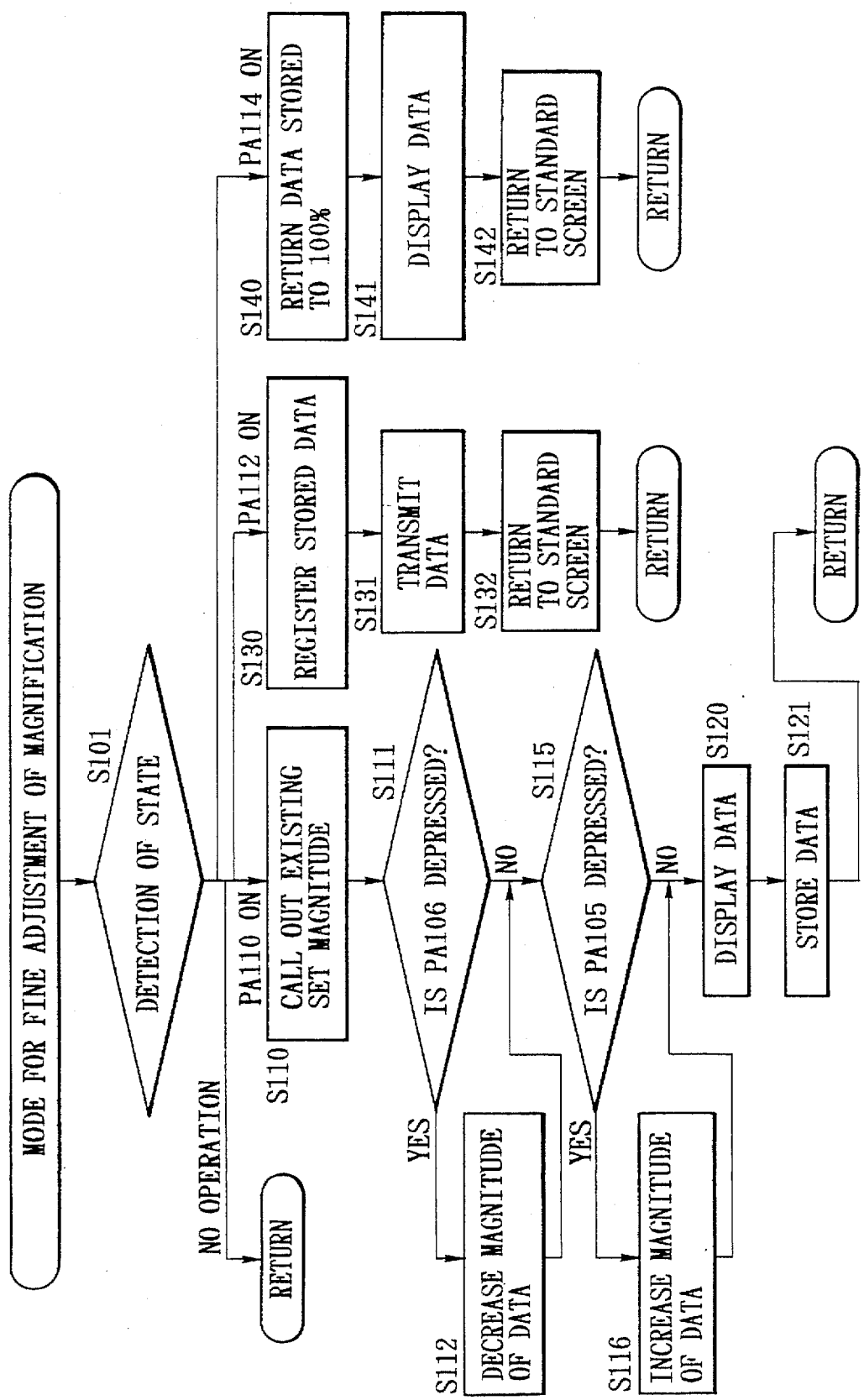
FIG. 6 is a flow chart illustrating the processing made in response to key manipulations on the operating panel in the mode of fine adjustment of magnification.

When the mode is confirmed to be the one requiring the rotation by 90 degrees or 270 degrees at the step S201, the processing advances to a step S220 and calls out of the memory the data of set magnitudes transmitted at the step S131 of FIG. 6 and already subjected to fine adjustment of the magnification. Then, the sub-routine for setting the magnification in the main direction is carried out at a step S230 and the sub-routine for setting the magnification in the sub direction is subsequently carried out at a step S240 and thereafter the processing of the present flow chart is completed. The contents of the processings at the steps S230 and S240 will be described in detail below.

Figure 8:
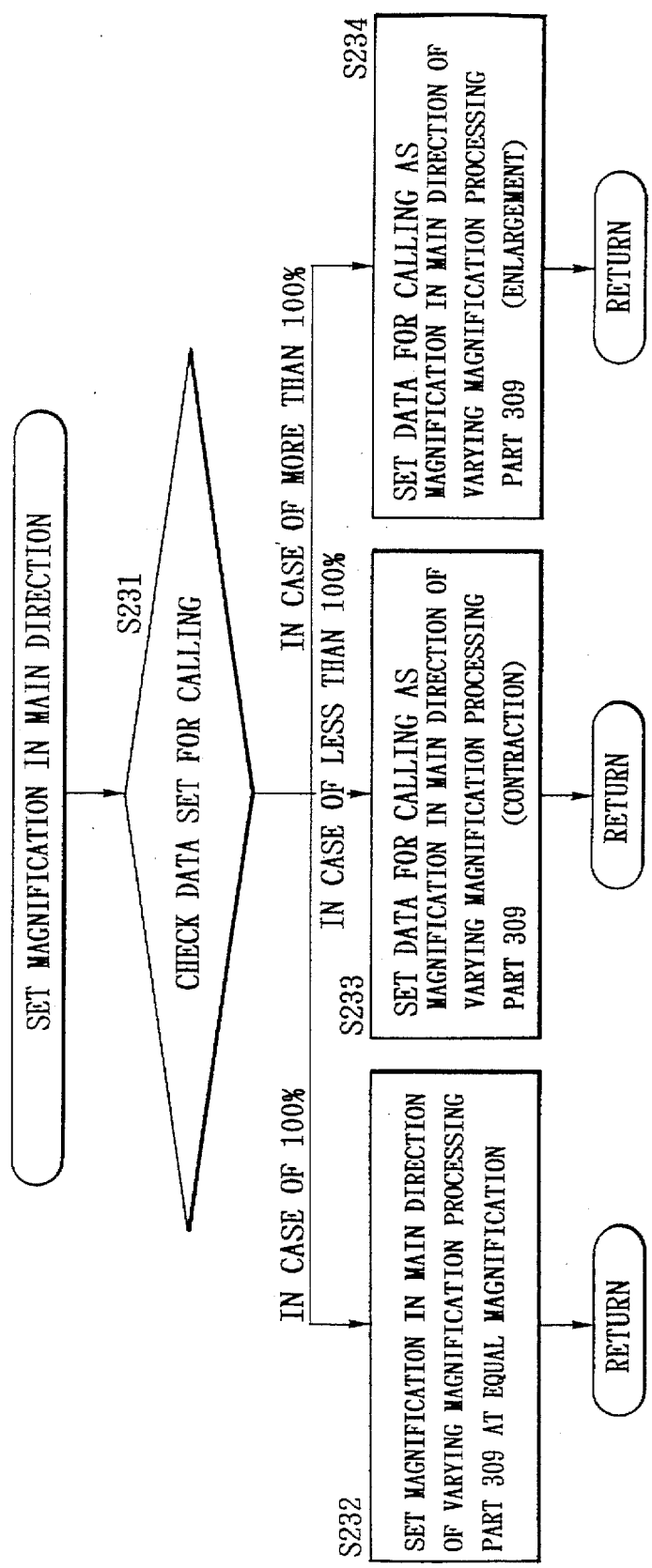
FIG. 8 is a flow chart illustrating one example of the sub-routine for setting the magnification in the main direction.

FIG. 8 is a flow chart illustrating one example of the sub-routine for setting the magnification in the main direction which is executed at the step S230. In the present embodiment, when this sub-routine is called out, first the question of whether or not the set magnitude of magnification represented by the data of set magnitude called out of the memory is 100% is judged. When the set magnitude of magnification is confirmed to be 100% at a step S231, the processing advances to a step S232 and sets the magnification in the main direction of the varying magnification processing part 309 at the equal magnification. The processing of this sub-routine is completed thereafter.

When the set magnitude of magnification is confirmed to be less than 100% at the step S231, namely when the scanning speed of the scanner 19 is adjusted so-as to be lower than the standard level, the processing proceeds to a step S233 and sets the data of set magnitude (the data representing the set magnitude of magnification already subjected to fine adjustment) called out of the memory as the data of magnification in the main direction of the varying magnification processing part 309. Thereafter, the processing of this sub-routine is completed. By the processing carried out as described above, the image of the original document read out by the scanner 19 is contracted in the main direction at the varying magnification processing part 309 during the subsequent copying operation.

When the set magnitude of magnification is confirmed to be larger than 100% at the step S231, namely when the scanning speed of the scanner 19 is adjusted to be higher than the standard level, the processing proceeds to a step S234 and, in the same manner as described above, sets the data of set magnitude called out of the memory as the data of magnification in the main direction of the varying magnification processing part 309. Thereafter, the processing of this sub-routine is completed. By the processing carried out as described above, the image of the original document read out by the scanner 19 is enlarged in the main direction at the varying magnification processing part 309 during the subsequent copying operation.

Figure 9:
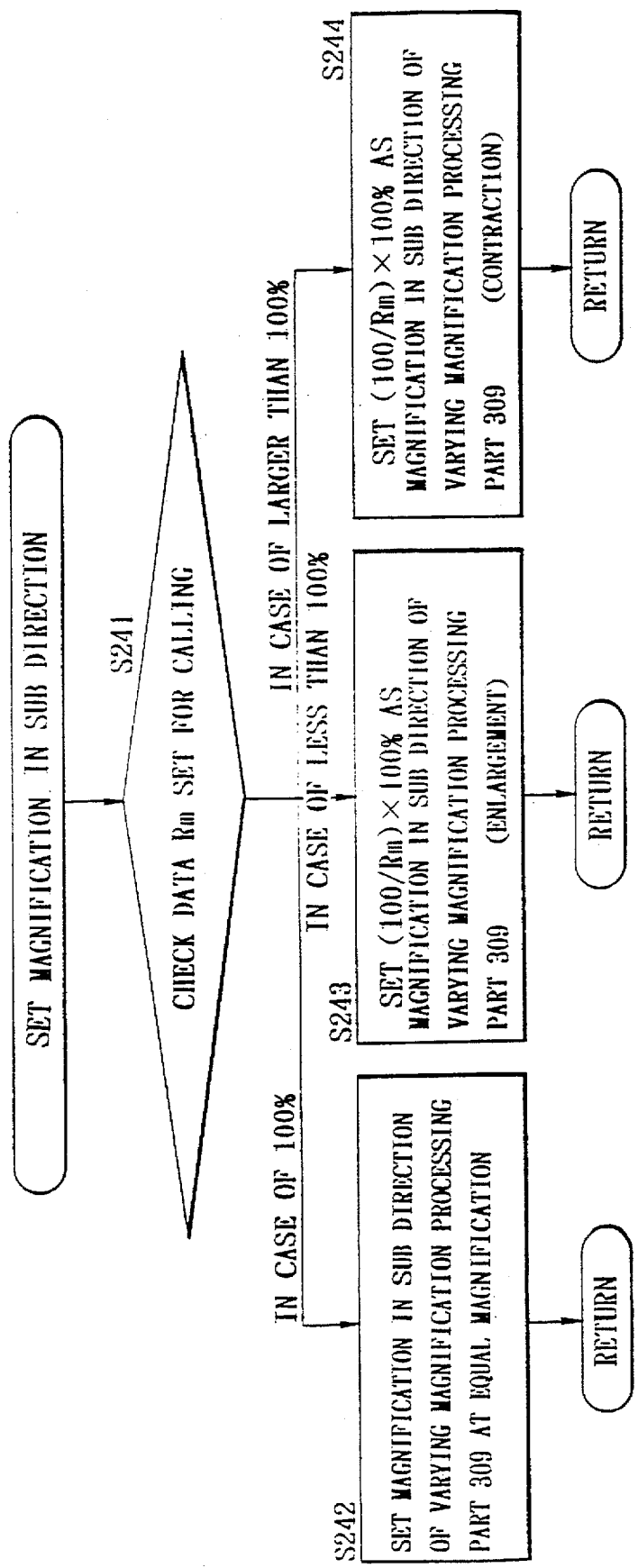
FIG. 9 is a flow chart illustrating one example of the sub-routine for setting the magnification in the sub direction.

FIG. 9 is a flow chart illustrating one example of the sub-routine for setting the magnification in the sub direction which is executed at a step S240. In this example, when this sub-routine is called out, first the question of whether or not the set magnitude of the magnification represented by the data of set magnitude called out of the memory is 100% is judged at a step S241.

When the set magnitude of the magnification is confirmed to be 100% at the step S241, the processing proceeds to a step S242 and sets the magnification in the sub direction of the varying magnification processing part 309 at an equal magnification. The processing of this sub-routine is completed thereafter.

When the set magnitude of the magnification is confirmed to be less than 100% at the step S241, namely when the scanning speed of the scanner 19 is adjusted to be lower than the standard level, the processing proceeds to a step S243 and sets the magnitude obtained by dividing "100" by the magnitude (the set magnitude of magnification already subjected to fine adjustment) Rm represented by the data of set magnitude called out of the memory and multiplying the resultant quotient by "100," namely the data representing the magnitude of (100/Rm)×100, as the data of magnification in the sub direction of the varying magnification processing part 309. Thereafter, the processing of this sub-routine is completed. By the processing carried out as described above, the image of the original document read out by the scanner 19 is enlarged in the sub direction at the varying magnification processing part 309 during the subsequent copying operation.

When the set magnitude of magnification is confirmed to be larger than 100 at the step S241, namely when the scanning speed of the scanner 19 is adjusted to be higher than the standard level, the processing proceeds to a step S244 and, in the same manner as described above, sets the magnitude obtained by dividing "100" by the magnitude Rm represented by the data of set magnitude called out of the memory and multiplying the resultant quotient by "100," namely the data representing the magnitude of (100/Rm)× 100, as the data of magnification in the sub direction of the varying magnification processing part 309. Thereafter, the processing of this sub-routine is completed. By the processing carried out as described above, the image of the original document read out by the scanner 19 is contracted in the sub direction at the varying magnification processing part 309 during the subsequent copying operation.

Figure 10:
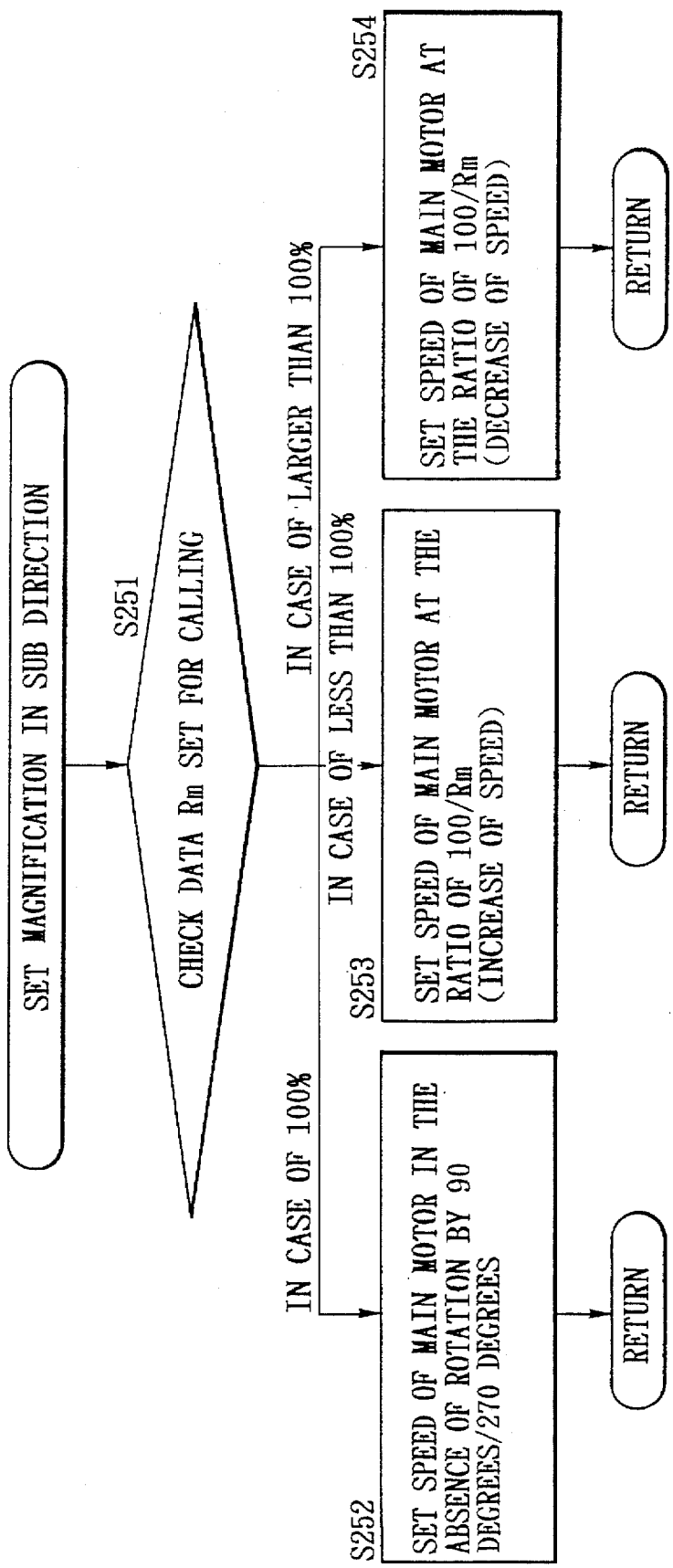
FIG. 10 is a flow chart illustrating another example of the sub-routine for setting the magnification in the sub direction.

FIG. 10 is a flow chart illustrating another example of the sub-routine for setting the magnification in the sub direction which is executed at the step S240. In this example, the magnification of output image in the sub direction is adjusted by controlling the rotational speed of the main motor M1 instead of adjusting the magnification of output image by the varying magnification processing part 309. In this example, unlike in the example of sub-routine of FIG. 9 which is executed by the CPU 3, the sub-routine for setting the magnification is carried out by the CPU 4 which is responsible for the control of the print optical system and the image producing system.

In this example, when the sub-routine is called out, first the question of whether or not the set magnitude of magnification represented by the data of set magnitude called out of the memory is 100% is judged at a step S251 in the same manner as in the example of FIG. 9.

When the set magnitude of magnification is confirmed to be 100% at the step S251, the processing proceeds to a step S252 and sets the speed of the main motor M1 at the magnitude prefixed as the speed to be used when the processing for rotation by 90 degrees or 270 degrees is not performed at the rotary processing part 307 (FIG. 4) (hereinafter referred to as "ordinary magnitude"). Thereafter, the processing of this sub-routine is completed.

When the set magnitude of magnification is confirmed to be less than 100% at the step S251, namely when the scanning speed of the scanner 19 is adjusted to be lower than the standard level, the processing proceeds to a step S253 and sets the speed of the main motor M1 so that the ratio of the speed of the main motor M1 to the ordinary magnitude mentioned above will equal 100/Rm, i.e. the magnitude obtained by dividing "100" by the magnitude (the set magnitude of magnification already subjected to fine adjustment) Rm represented by the data of set magnitude called out of the memory. Subsequently, the processing of this sub-routine is completed. By the processing carried out as described above, the speed of the main motor M1 as the source of drive for the image producing system is increased based on the magnitude, 100/Rm, mentioned above during the subsequent copying operation. As a result, the image of the original document read out by the scanner 19 is produced as enlarged in the sub direction.

When the set magnitude of magnification is confirmed to be larger than 100% at the step S251, namely when the scanning speed of the scanner 19 is adjusted to be higher than the standard level, the processing proceeds to a step S254 and, in the same manner as described above, sets the speed of the main motor M1 so that the ratio of the speed of the main motor M1 to the ordinary magnitude mentioned above will equal 100/Rm, i.e. the magnitude obtained by dividing "100" by the magnitude Rm represented by the data of set magnitude called out of the memory. Thereafter, the processing of this sub-routine is completed. By the processing carried out as described above, the speed of the main motor M1 as the source of drive for the image producing system is decreased based on the magnitude, 100/Rm, mentioned above during the subsequent copying operation. As a result, the image of the original document read out by the scanner 19 is produced as contracted in the sub direction.

<Concrete examples of output>

Figure 11:
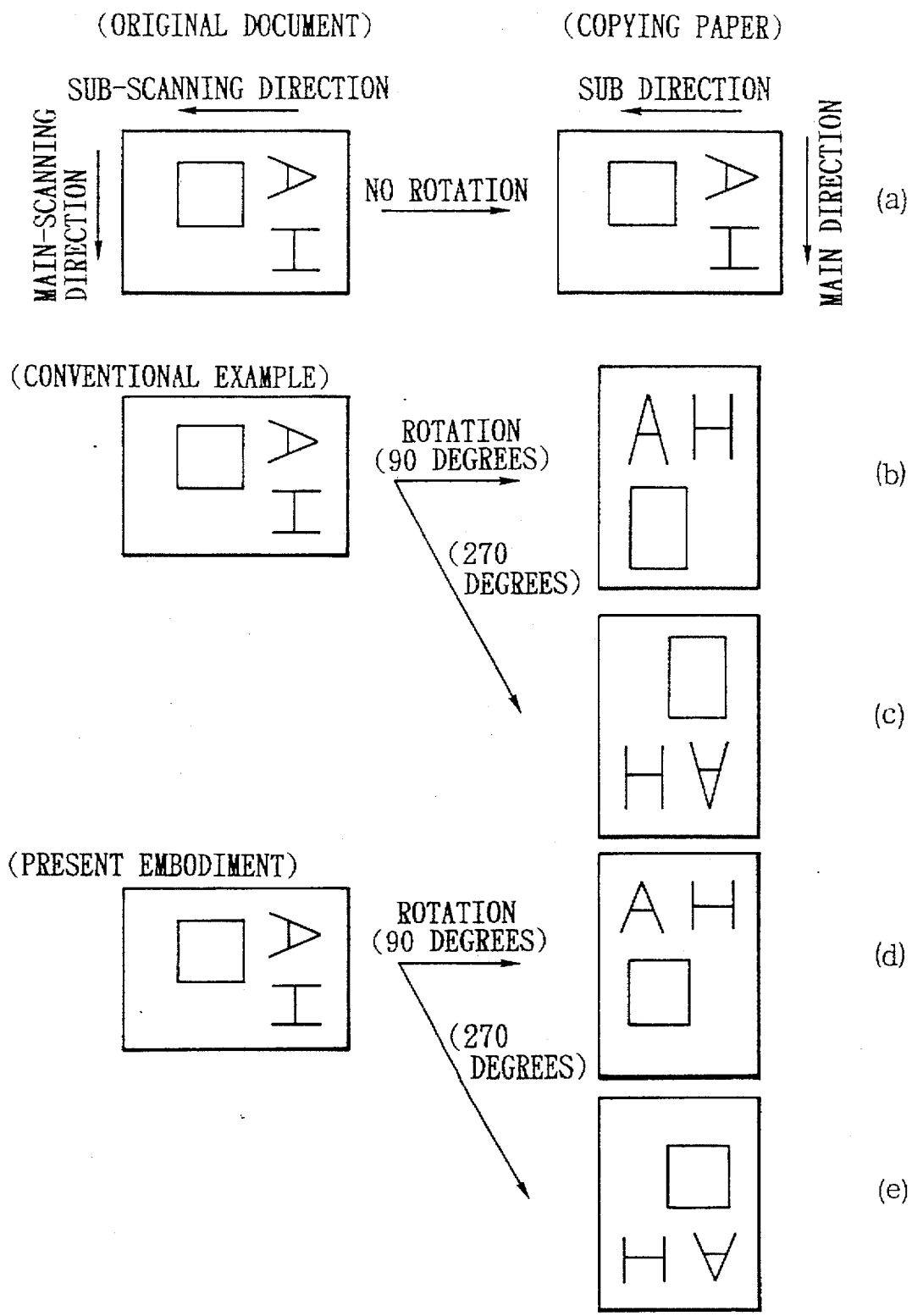
FIG. 11 is a diagram illustrating images on an original document and a copying paper obtained when fine adjustment is effected by key manipulations on the operating panel for the purpose of lowering the scanning speed produced relative to the original document.

FIGS. 11 (a)–(e) are diagrams illustrating various images severally obtained on an original document and a copying paper when fine adjustment is effected by key manipulations on the operating panel shown in FIG. 5 so as to lower the scanning speed of the scanner 19.

FIG. 11 (a) represents the image produced on the copying paper in the same direction as the direction in which the original document is set in place, namely the image produced without being processed for rotation by the rotary processing part 307 in the memory unit part 30. In this case, the magnifications in the longitudinal and the lateral directions of the image (output image) on the copying paper arouse no feeling of extraneity because the scanning speed of the scanner 19 is finely adjusted in conformity with the system speed of the image producing system (the driving speed of the main motor M1, etc.).

FIGS. 11 (b) and (c) represent the images which are obtained by rotating respectively by 90 degrees and 270 degrees the images read out by the scanner and stored provisionally in the memory of the conventional digital copying machine. It is clearly noted from these diagrams that when the adjustment is made so as to decrease the scanning speed of the scanner, the images produced as outputs on the copying papers in consequence of the rotation by 90 degrees or 270 degrees are inevitably enlarged in the main direction and contracted in the sub direction as compared with the image on the original document.

FIGS. 11 (d) and (e) represent the images which are obtained by rotating respectively by 90 degrees and 270 degrees by means of the rotary processing part 307 the images read out by the scanner and stored provisionally in the memory of the digital copying machine of the present embodiment. In this embodiment, when the image is produced as rotated by 90 degrees or 270 degrees by means of the rotary processing part 307 while the scanning speed of the scanner 19 is finely adjusted so as to be lowered, the control of the magnification is carried out so that the produced image will be contracted in the main direction (the step S233 in FIG. 8) and enlarged in the sub direction (a step S243 of FIG. 9 and a step S253 of FIG. 10) by an amount corresponding to the amount of adjustment made on the operating panel shown in FIG. 5. As a result, output images which arouse no feeling of extraneity about the magnifications and sizes in the longitudinal and the lateral directions are obtained on the copying papers as illustrated in FIGS. 11 (d) and (e).

In the conventional digital copying machine, when the image is produced as rotated by 90 degrees or 270 degrees while the scanning speed of the scanner is adjusted to a higher level, the image on the copying paper is inevitably contracted in the main direction and enlarged in the sub direction as compared with the image of the original document. In accordance with the digital copying machine of the present embodiment, the control of the magnification in this case is carried out so that the output image may be enlarged in the main direction (the step S234 of FIG. 8) and contracted in the sub direction (the step S244 of FIG. 9 and the step S254 of FIG. 10) by an amount corresponding to the amount of adjustment to be made on the operating panel. Also when the scanning speed of the scanner 19 is adjusted to a higher level, the output image obtained on the copying paper arouses no feeling of extraneity as to the magnifications and sizes in the longitudinal and the lateral directions.

Embodiment 2

<Whole construction>

Figure 12:
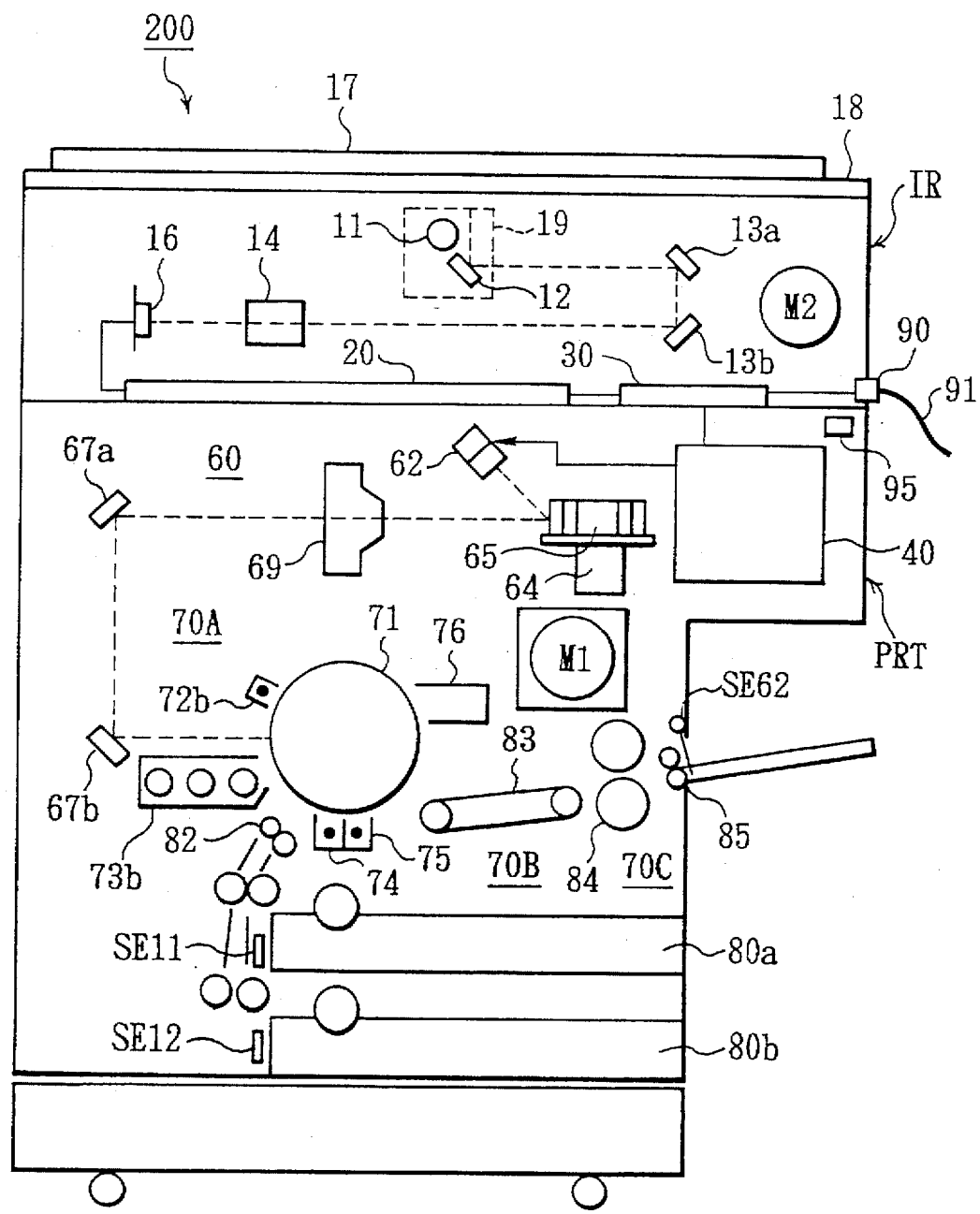
FIG. 12 is a longitudinal section illustrating the whole construction of a digital copying machine according to another embodiment of this invention.

FIG. 12 is a longitudinal section illustrating the whole construction of a digital copying machine 200 as another embodiment of this invention. This digital copying machine 200 is identical in construction with the digital copying machine of the first embodiment, excepting it is provided in the memory unit part 30 thereof with the external interface part 310 and is adapted to receive data from and transmit data to external devices through the medium of an external device connector 90 and an interface cable 91. The image data which has been processed in the memory unit part 30 is transmitted to the print processing part 40 of the printer device. The image signal processing part 20 is identical with that already described with reference to FIG. 3 in the first embodiment. The details of the memory unit part 30 will be described herein below.

Figure 13:
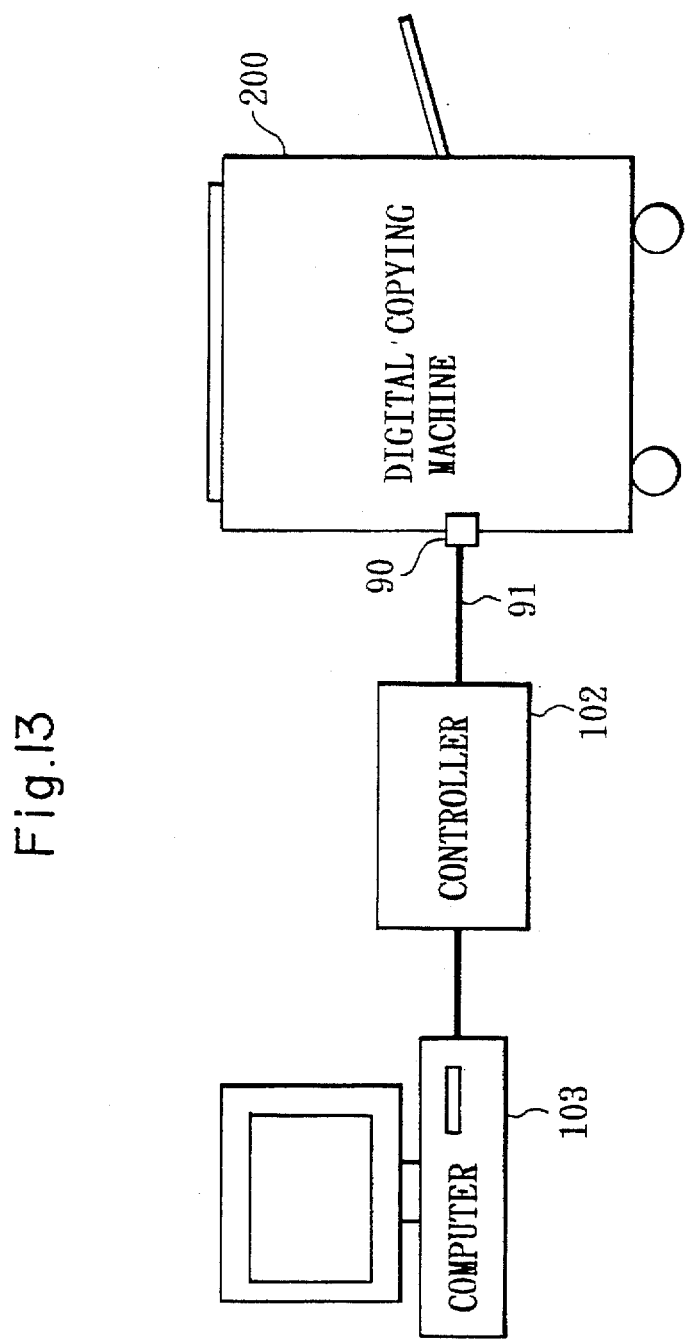
FIG. 13 is a system configuration diagram representing one working mode of the digital copying machine.

FIG. 13 is a system configuration diagram representing one working mode of the digital copying machine 200 having the construction mentioned above. In this system configuration, controller 102 is connected to the external device connector 90 of the digital copying machine 200 through the medium of the interface cable 91 and the controller 102 is further connected to a computer 103. In this system configuration, the digital copying machine 200 is enabled to introduce the image data formed on the external computer 103 and produce as an output an image represented by the image data instead of producing the image of the original document read out by the scanner 19.

In the construction of FIG. 13 described above, the image data formed on the computer 103 is transmitted to the controller 102 by the print manipulation on the computer 103. The controller 102 is provided with a memory which has a capacity for at least one screen full of image data and is consequently enabled to convert the image data received from the computer 103 into a raster-scan data. The image data thus converted into the raster-scan data is transferred to the digital copying machine 200. The digital copying machine 200 produces an image represented by the image data as an output on the paper. This invention is not limited to the digital copying machine designed for the mode of use illustrated in FIG. 13 but may be applied to the digital copying machine designed to be used as connected to a telephone line via a modem, for example, and consequently allowed to introduce an image data through the telephone line.

<Construction of controlling part>

Figure 14:
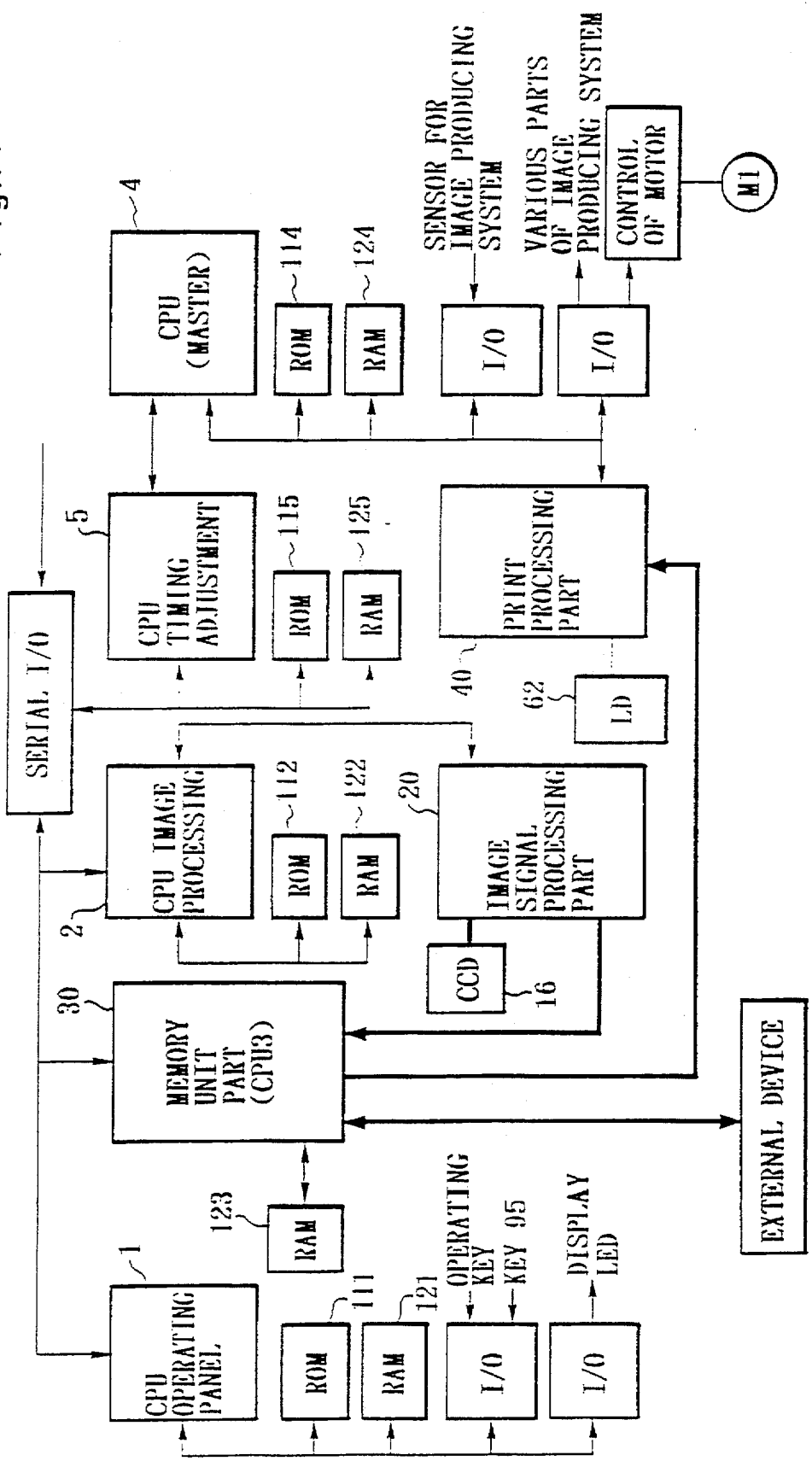
FIG. 14 is a block diagram illustrating the construction of a controlling part.

FIG. 14 is a block diagram illustrating the construction of the controlling part of the digital copying machine 200 having the construction described above. The component elements already mentioned will be denoted by like reference numerals herein below.

In this controlling part, the memory unit part 30 is endowed with a function of receiving data from and transmitting data to an external device. The CPU 3 discharges the role of controlling this transfer of data. The controlling part is identical in the other aspect of construction to that of the first embodiment described with reference to FIG. 2.

<Control and operation of scanning system and image signal processing part>

These are the same as those of the first embodiment already described with reference to FIG. 3 and the description thereof, therefore, will be omitted.

<Control and operation of memory unit part>

Figure 15:
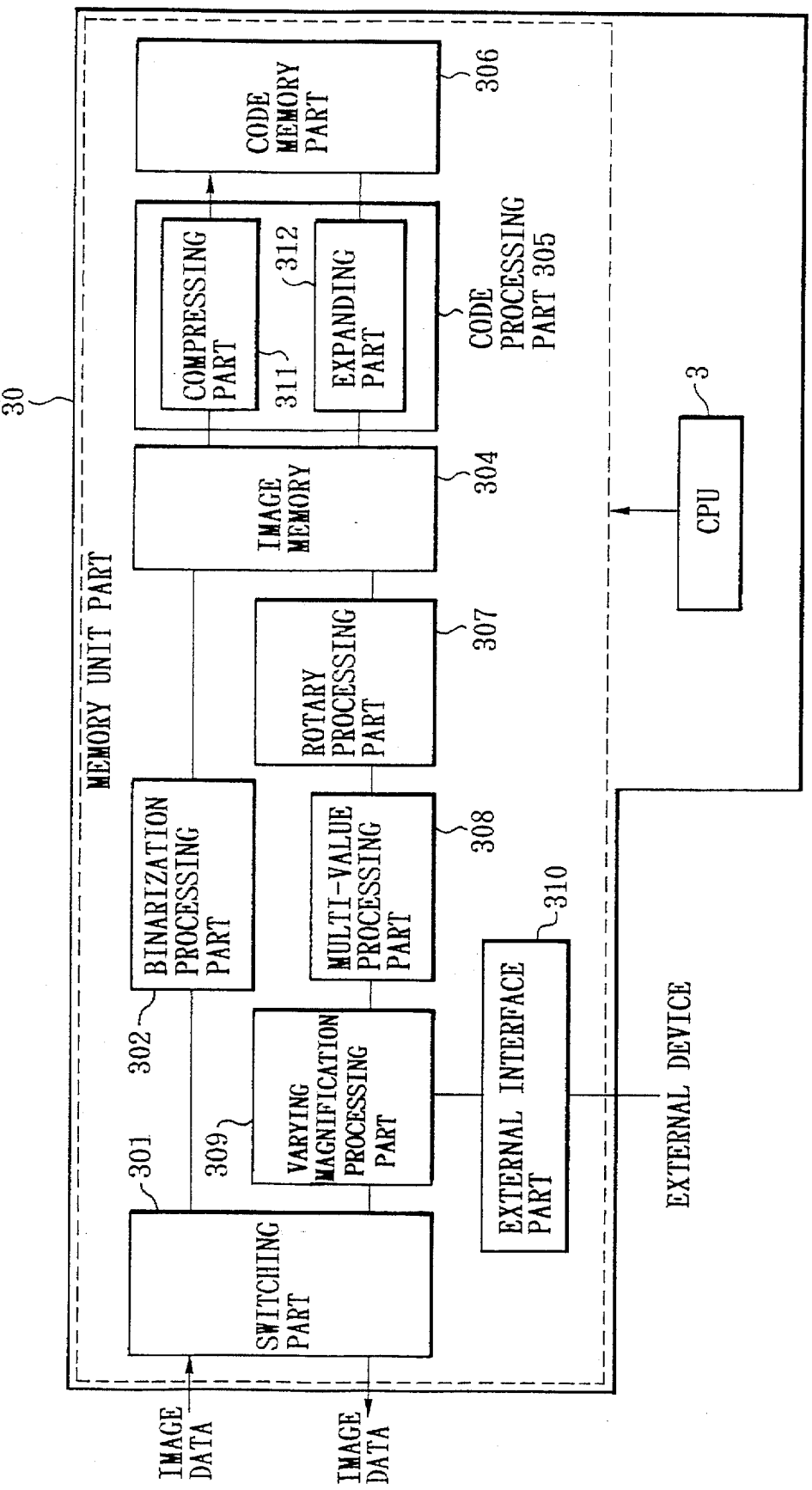
FIG. 15 is a block diagram illustrating the construction of a memory unit part.

FIG. 15 is a block diagram illustrating the inner construction of the memory unit part 30. An external interface part 310 is connected to the varying magnification processing part 309 and adapted to discharge the role of transferring data to and from the external device. This external interface part 310 introduces image data from the external device and consequently enables the varying magnification processing part 309 to perform an varying magnification processing on the image data. The transfer of control information by this external interface part 310 in managed by the CPU 3. The memory unit part of this embodiment is identical in the other aspect of construction with that of the first embodiment described with reference to FIG. 4 and the description thereof, therefore, will be omitted.

<Fine adjustment of magnification>

This is the same as that of the first embodiment already described with reference to FIG. 5 and the description thereof, therefore, will be omitted.

<Operation in the mode of fine adjustment of magnification>

Now, the operation of the digital copying machine of the present embodiment in the mode of fine adjustment of magnification will be described below.

The processing which is performed herein in response to the key manipulation on the operating panel in the mode of fine adjustment of magnification is the same as that of the first embodiment described with reference to FIG. 6.

Figure 16:
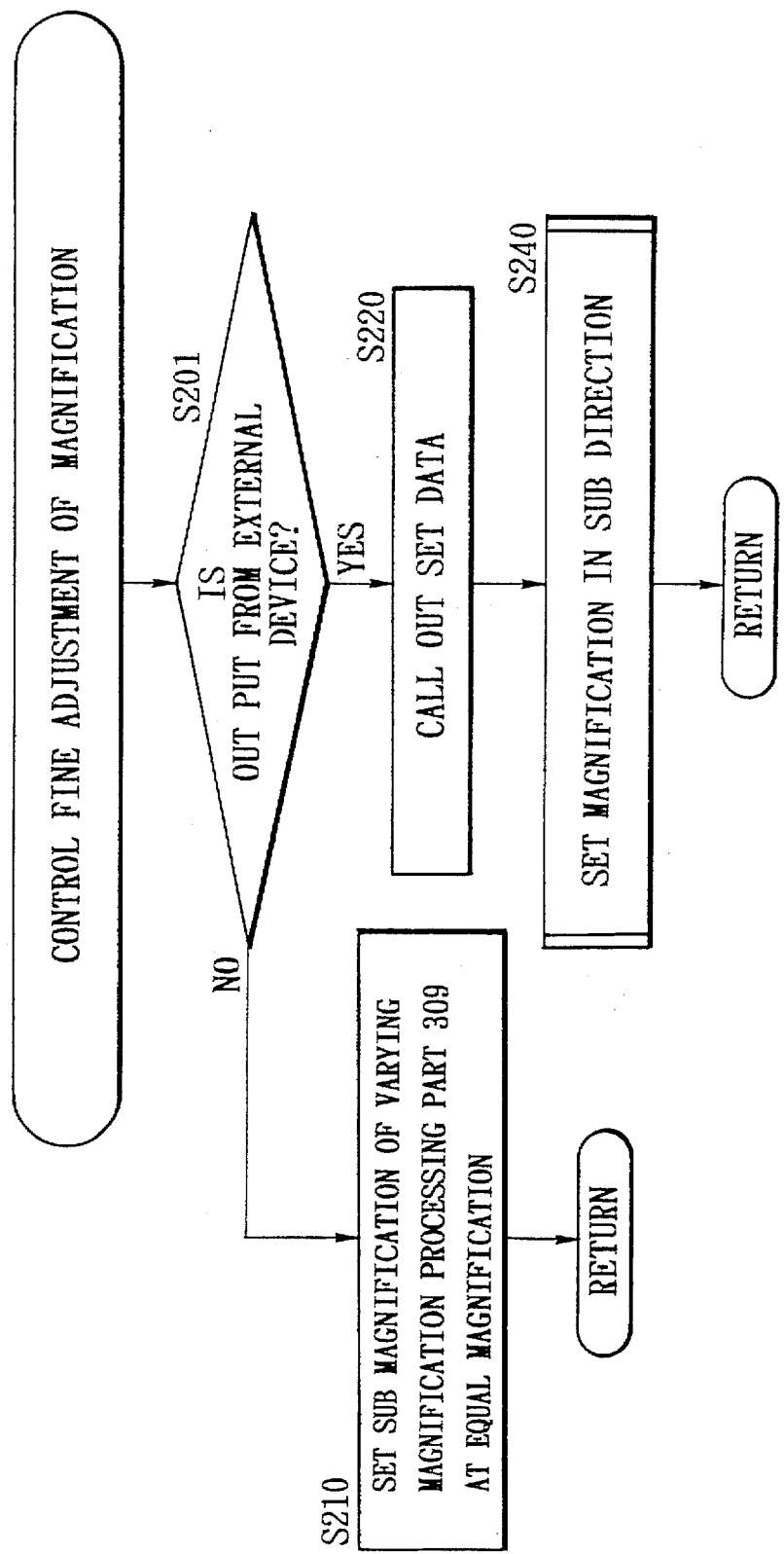
FIG. 16 is a flow chart illustrating the processing made for the control of a magnification of output image in the mode of fine adjustment of magnification.

Next, the processing for the control of the magnification of output image in the mode of fine adjustment of magnification will be described below. This processing is carried out by the CPU 3 which controls the memory unit part 30. At this time, the CPU 3 operates as illustrated in the flow chart of FIG. 16.

When the mode of fine adjustment of magnification is initiated, the question of whether or not the existing mode is for introducing image data from the external device is judged at the step S201.

When the question on the mode draws out a negative answer at the step S201, the processing proceeds to the step S210 and sets the data of equal magnification as the set magnitude of magnification in the sub direction for the varying magnification processing part 309 in the memory unit part 30. Thereafter, the processing of this flow chart is completed.

Figure 7:
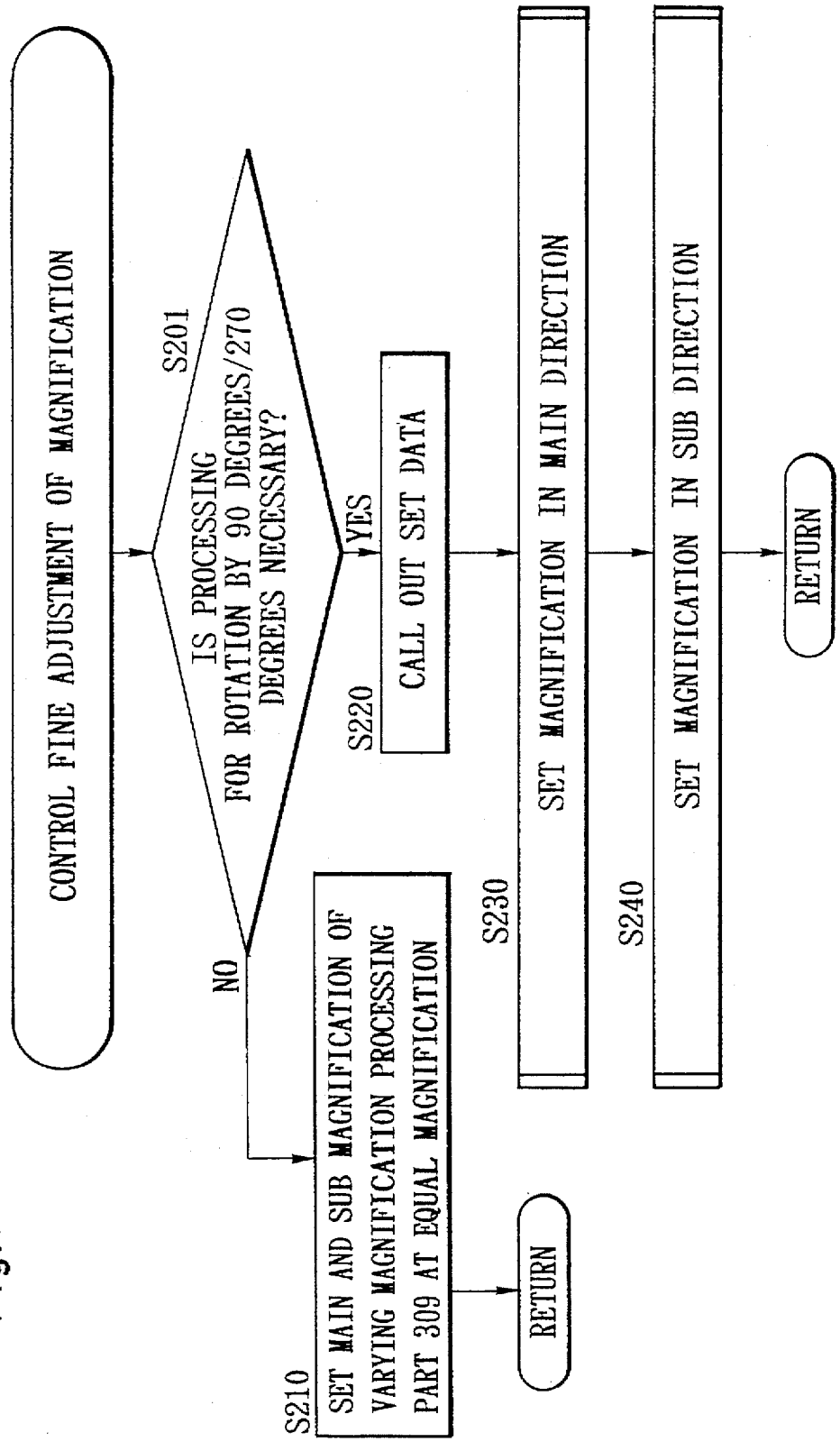
FIG. 7 is a flow chart illustrating the processing made for the control of the magnification of output image in the mode of fine adjustment of magnification.

When the question on the mode draws out an affirmative answer at the step S201, the processing proceeds to the step S220 and calls out of the memory the data of set magnitude which has been transmitted at the step S131 of FIG. 7 and already undergone the fine adjustment of magnification. Then, the sub-routine for setting the magnification in the sub direction is executed at the step S240. Thereafter, the processing of this flow chart is completed. The contents of the processing at the step S240 are the same as those of the first embodiment illustrated in FIG. 9 and FIG. 10 and the description thereof, therefore, will be omitted.

<Concrete examples of output>

FIG. 17 (a) illustrates for referential purpose an original document and an output image which are common in the mode for producing as an output the image read out by the scanner 19 (the ordinary mode for a copying machine). When the embodiment is used as a copying machine and the speed of the image producing device happens to deviate from the magnitude set as a target, it is made possible by adjusting the scanning speed of the scanner 19 to prevent the output image from arousing a feeling of extraneity as to the sizes thereof in the longitudinal and the lateral directions as illustrated in FIG. 17 (a).

FIGS. 17 (b)–(e) illustrate images on a computer and output images obtained in the mode for enabling the image represented by the image data introduced from the computer as an external device to be produced as an output by a digital copying machine (FIG. 13). In all these cases, the speeds of the image producing system deviate from the level set as a target.

FIGS. 17 (b) and (c), among other figures of FIG. 17, represent the case of using a conventional digital copying machine. In this case, the output image is enlarged in the sub direction (FIG. 17 (b)) when the speed of the image producing system is higher than the level set as a target and it is contracted in the sub direction (FIG. 17 (c)) when the speed is lower than the set level. As a result, the magnification of output image differs in the main direction and the sub direction and the output image arouses a feeling of extraneity as to the sizes thereof in the longitudinal and the lateral directions.

FIGS. 17 (d) and (e) represent the case of using a digital copying machine 200 of the present embodiment. In this embodiment, when the image represented by image data introduced from the computer 103 as an external device is produced as an output, the set magnitude of magnification corresponding to the scanning speed of the scanner 19 adjusted for compensating for deviation of the speed of the image producing system from the level set as a target is read out (the steps S201 and S220 in FIG. 16) and the magnification of output image in the sub direction is controlled based on the set magnitude of magnification already adjusted (S240). Specifically, the magnification is so controlled as to contract the output image in the sub direction (the step S244 of FIG. 9 and the step S254 of FIG. 10) in accordance with the set magnitude of magnification already undergone the adjustment mentioned above when the speed of the image producing system is higher than the level set as a target and the magnification is so controlled as to enlarge the output image in the sub direction (the step S244 of FIG. 9 and the step S254 of FIG. 10) in accordance with the set magnitude of magnification already undergone the adjustment mentioned above when the speed of the image producing system is lower than the level set as a target. Even when the speed of the image producing system happens to deviate from the set magnitude, therefore, the output image does not arouse a feeling of extraneity as to the sizes thereof in the longitudinal and the lateral directions because the magnification of output image is identical between the main direction and the sub direction.

Embodiment 3

In the system configuration illustrated in FIG. 13 which is intended to produce as an output the image represented by the image data introduced from the computer as the external device, the possibility of the external device being endowed with such a function as varies the magnification of the image represented by the image data is undeniable. In this case, the adjustment of the magnification of output image for the sake of compensation of the deviation of the speed of the image producing system can be executed on the external device side. The embodiment of this invention in this respect will be described below with reference to FIG. 13 and FIG. 18.

Figure 18:
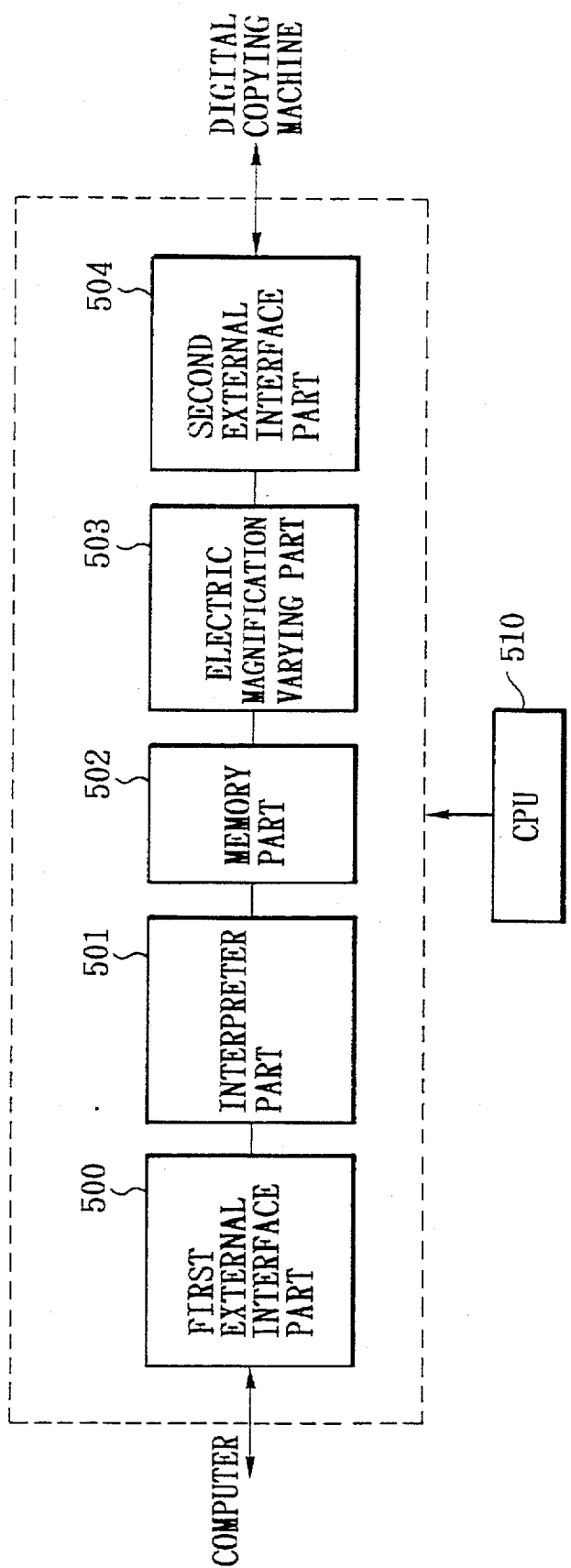
FIG. 18 is a diagram illustrating the construction of a controller on the external device side to be used in one working mode of a digital copying machine according to still another embodiment of this invention.

FIG. 18 is a block diagram illustrating the inner construction of the controller 102 (FIG. 13) on the external device side to be used in the present embodiment. This controller 102 is composed of a first external interface part 500, an interpreter part 501, a memory part 502, an electric magnification varying part 503, a second external interface part 504, and a CPU 510 for controlling the component parts mentioned above.

In the controller 102 of the construction described above, the first interface part 500 serves the purpose of receiving data from and transmitting data to the computer 103 and the second interface part 504 the purpose of receiving data from and transmitting data to the digital copying machine 200. The image data which is written in such a page descriptive language as, for example, a postscript and transmitted from the computer 103 is introduced via the first interface part 500 to the interpreter part 501, translated in the interpreter part 501, and then processed to be developed into raster-scan data. The image data thus developed into the raster-scan data is accumulated in the memory part 502. When one page full of the image data is accumulated in the memory part 502, the one page full of the image data is subjected to the processing for change of magnification based on the magnification set in the CPU 510 at the electric magnification varying part 503. The image data resulting from the processing for change of magnification is transferred via the second interface part 504 to the digital copying machine 200. The operation described above is carried out as controlled by the CPU 510. The controller 102 is capable of receiving the data transmitted from the digital copying machine 200 through the medium of the second external interface. The data thus received is stored in the memory part 502.

Figure 19:
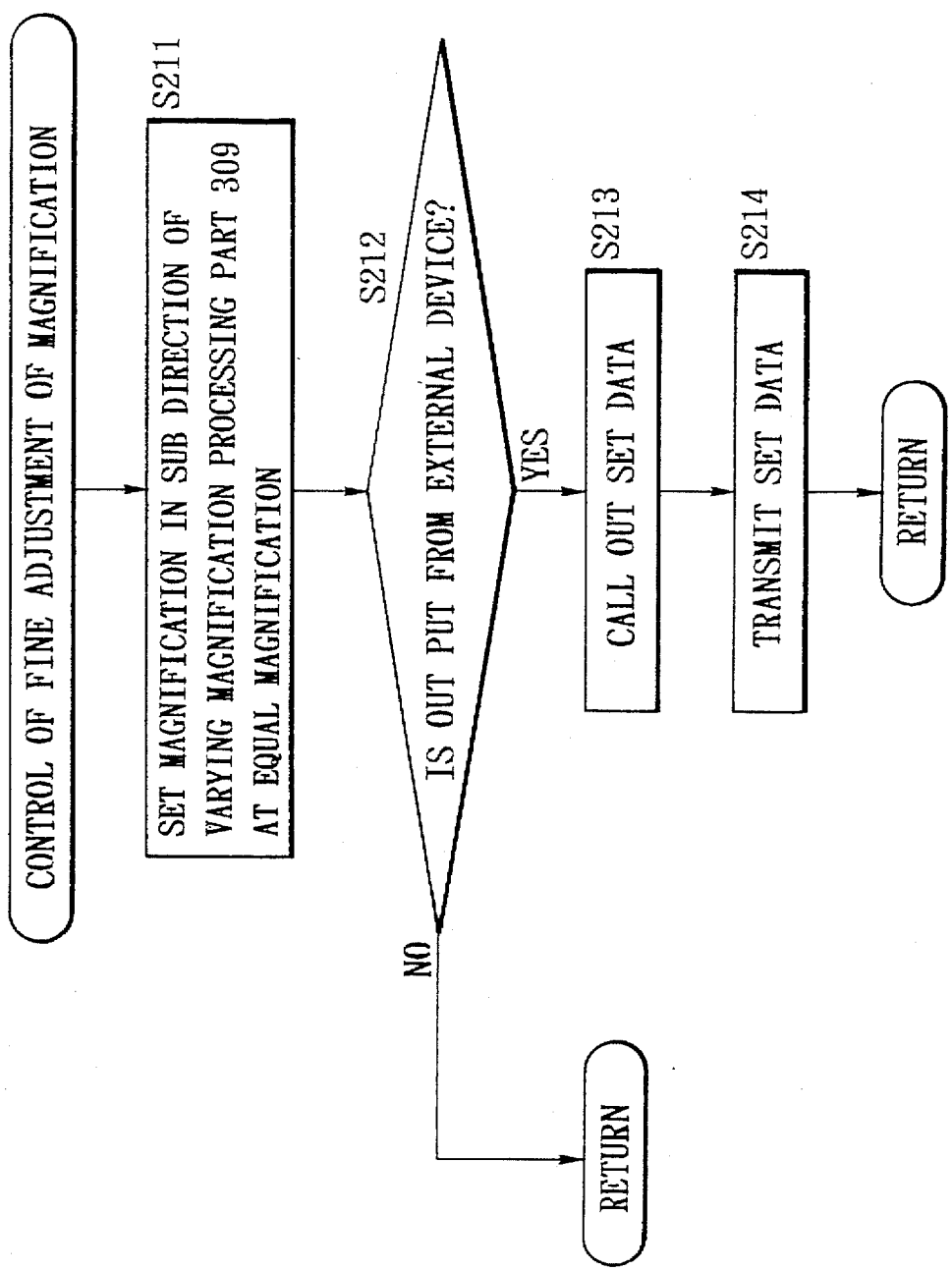
FIG. 19 is a flow chart illustrating the processing made for the control of the magnification of output image of the digital copying machine of the embodiment mentioned above in the mode of fine adjustment of magnification.

In the digital copying machine of the present embodiment, the processing for controlling the magnification of output image in the mode of fine adjustment of magnification is different from that involved in the embodiment mentioned previously. To be specific, while the CPU 3 in the preceding embodiment operates as illustrated in the flow chart of FIG. 16 for the control of the magnification of output image, the present embodiment operates as illustrated in the flow chart of FIG. 19.

In the present embodiment, when the image represented by the image data introduced from the external device is produced as an output, the adjustment of the magnification of output image for the sake of compensation of the deviation of the speed of the image producing system is not carried out within the copying machine 200. When the mode for fine adjustment of the magnification is initiated, first the data of equal magnification is set at the step S211 as the set magnitude of magnification in the sub direction for the varying magnification processing part 309 in the memory unit part 30. Then at the step S212, the question of whether or not the existing mode is for introducing the image data from the external device is judged.

When the question on the mode mentioned above draws out a negative answer at the step S212, the processing of the present flow chart is completed.

When the question on the mode mentioned above draws out an affirmative answer at the step S212, the processing proceeds to the step S213 and calls out of the memory the data of set magnitude which has been transmitted at the step S131 of FIG. 7 and already undergone the fine adjustment of magnification. Then, the data of set magnitude is transmitted via the external interface part 310 to the controller 102 at the step S214. The processing of the present flow chart is completed thereafter.

The controller 102 controls the magnification of output image in the sub direction based on the data of set magnitude transmitted from the copying machine 200 as described above. This control is effected by the CPU 510 in the controller 102. At this time, the CPU 510 operates as illustrated in the flow chart of FIG. 20.

To be specific, first the data of set magnitude (which corresponds to the scanning speed of the original document adjusted for the sake of the compensation of the deviation of the speed of the image producing system) which has been transmitted from the copying machine 200 and has undergone fine adjustment of the magnification is called out of the memory at a step S401. Then, the question of whether or not the set magnitude of magnification represented by the data of set magnitude called out of the memory is 100% is judged at a step S402.

When the set magnitude of magnification is confirmed to be 100% at the step S402, the processing proceeds to a step S410 and sets the magnification in the sub direction of the electric magnification varying part 503 in the controller 102 at an equal magnification. Thereafter, the processing of the present flow chart is completed.

When the set magnitude of magnification is confirmed to be less than 100%, namely when the scanning speed of the scanner 19 is adjusted to a level lower than the standard level because the speed of the image producing system is lower than the standard level, the processing proceeds to a step S420 and sets the data representing the magnitude obtained by dividing "100" by the magnitude Rm (the set magnitude of magnification already undergone the fine adjustment) represented by the data of set magnitude called out of the memory and multiplying the resultant quotient by "100," namely the data representing the magnitude of (100/Rm)× 100, as the data of magnification in the sub direction of the electric magnification varying part 503. Thereafter, the processing of the present flow chart is completed. By the processing carried out as described above, the image represented by the image data transmitted from the computer 103 during the emission of the image as an output is enlarged in the sub direction in the electric magnification varying part 503.

When the set magnitude of magnification is confirmed to be larger than 100% at the step S402, namely when the scanning speed of the scanner 19 is adjusted to be higher than the standard magnitude because the speed of the image producing system is higher than the standard magnitude set as a target, the processing proceeds to a step S430 and, in the same manner as mentioned above, sets data representing the magnitude obtained by dividing "100" by the magnitude Rm represented by the data of set magnitude called out of the memory and multiplying the resultant quotient by "100," namely the data representing the magnitude of (100/Rm)× 100, as the data of magnification in the sub direction of the electric magnification varying part 503. The processing of the present flow chart is completed thereafter. By the processing carried out as described above, the image represented by the image data transmitted from the computer 103 during the emission of the image as an output is contracted in the sub direction in the electric magnification varying part 503.

According to the present embodiment, like the embodiment mentioned above, the output image does not arouse a feeling of extraneity as to the sizes thereof in the longitudinal and the lateral directions because the magnification of output image is identical between the main direction and the sub direction even when the speed of the image producing system deviates from the magnitude set as a target.

While there have been shown and described present preferred embodiments of the invention with reference to the accompanying drawings, it is to be distinctly understood that the invention is not limited thereto but that various changes and modifications may be made without departing from the spirit and scope of this novel concept as defined by the following claims.

Such changes and modifications, therefore, should be construed as being embraced by this invention unless they depart from the scope of the present invention.

What is claimed is:

1. An image forming apparatus comprising:
   (a) an image reader which scans an original document line by line in a sub-scanning direction at a predetermined scanning speed and produces an image data according to the original document;
   (b) a memory device for storing the image data produced by the image reader;
   (c) an image reproducer which reproduces an image on a recording medium corresponding to the image data stored in the memory device at a predetermined system speed;
   (d) a magnification adjuster for compensating magnification in the sub-scanning direction of an image represented by the image data by varying the scanning speed of the image reader or the system speed of the image reproducer;
   (e) an image rotator for processing the image data so that the image represented by the image data is rotated by 90 degrees or 270 degrees;
   (f) a detector which detects an amount of magnification compensation effected by the adjuster; and
   (g) a corrector which corrects magnifications in a lateral direction and a longitudinal direction of an image to be reproduced by the image reproducer corresponding to the amount of magnification compensation detected by the detector when the image rotator processes the image rotation.

2. The apparatus according to claim 1, wherein said adjuster increases the scanning speed of the image reader when the system speed of the reproducer is higher than a standard level, and decreases the scanning speed of the image reader when the system speed of the reproducer is lower than the standard level.

3. The apparatus according to claim 1, wherein said corrector carries out the magnification correction by processing an image data resulting from the image rotation so that the magnification compensation effected by the adjuster is canceled and the magnification in the sub-scanning direction of the image represented by the image data resulting from the image rotation is corrected corresponding to the amount of the magnification compensation effected by the adjuster.

4. The apparatus according to claim 1, wherein said image reader is provided with a CCD line sensor.

5. An image forming apparatus comprising:
   (a) an image reader which scans an original document line by line in a sub-scanning direction at a predetermined scanning speed and produces a digital image data according to the original document;
   (b) a memory device which stores the digital image data produced by the image reader;

(c) an image reproducer which reproduces an image on a recording medium corresponding to the digital image data stored in the memory device at a predetermined system speed;

(d) a magnification adjuster for compensating a magnification in the sub-scanning direction of an image represented by the digital image data by varying the scanning speed of the image reader or the system speed of the image reproducer, said adjuster being operable by an operator;

(e) an image rotator for processing the digital image data so that the image represented by the digital image data is rotated by 90 degrees or 270 degrees;

(f) a detector which detects an amount of magnification compensation effected by the adjuster; and (g) an automatic corrector which automatically corrects magnifications in a lateral direction and a longitudinal direction of an image to be reproduced by the image reproducer corresponding to the amount of magnification compensation detected by the detector when the image rotator processes the image rotation.

6. An image forming apparatus comprising:

(a) an image reader which reads an original document and produces an image data according to the original document;

(b) an image reproducer which reproduces an image corresponding to the image data produced by the image reader;

(c) an image rotator for processing the image data produced by the image reader so that an image represented by the image data is rotated by 90 degrees or 270 degrees; and (d) a corrector which corrects a magnification of an image to be reproduced by the image reproducer when the image rotator processes the image rotation.

7. An image forming apparatus comprising:

(a) an image reader which scans an original document line by line in a sub-scanning direction at a predetermined scanning speed and produces an image data according to the original document;

(b) an interface for introducing an image data from an external device;

(c) an image reproducer which reproduces an image on a recording medium selectively corresponding to the image data produced by the image reader or the image data introduced from the external device at a predetermined system speed;

(d) a magnification adjuster for compensating a magnification in the sub-scanning direction of an image represented by the image data produced by the image reader by varying the scanning speed of the image reader;

(e) a detector which detects an amount of magnification compensation effected by the adjuster; and (f) a corrector which corrects a deviation between a magnification in a lateral direction and a magnification in a longitudinal direction of an image represented by the image data introduced from the external device corresponding to the amount of magnification compensation detected by the detector.

8. The apparatus according to claim 7, wherein said adjuster increases the scanning speed of the image reader when the system speed of the reproducer is higher than a standard level, and decreases the scanning speed of the image reader when the system speed of the reproducer is lower than the standard level.

9. The apparatus according to claim 7, wherein said corrector carries out the magnification correction by processing the image data introduced from the external device so that a magnification in the sub-scanning direction of an image represented by the image data introduced from the external device is contracted when the system speed of the image reproducer is higher than a standard level, and is enlarged when the system speed of the image reproducer is lower than the standard level.

10. The apparatus according to claim 7, wherein said image reader is provided with a CCD line sensor.

11. An image forming apparatus comprising:

(a) an image reader which scans an original document line by line in a sub-scanning direction at a predetermined scanning speed and produces a digital image data according to the original document;

(b) an interface for introducing a digital image data from an external device;

(c) a memory device for selectively storing the digital image data or the digital image data introduced from the external device;

(d) an image reproducer which reproduces an image on a recording medium corresponding to the digital image data stored in the memory device at a predetermined system speed;

(e) a magnification adjuster for compensating a magnification in the sub-scanning direction of an image represented by the digital image data by varying the scanning speed of the image reader, said adjuster being operable by an operator;

(f) a detector which detects an amount of magnification compensation effected by the adjuster; and (g) an automatic corrector which corrects a deviation between a magnification in a lateral direction and a magnification in a longitudinal direction of an image represented by the digital image data introduced from the external device.

12. An image forming apparatus comprising:

(a) an image reader which reads an original document and produces an image data according to the original document;

(b) an interface for introducing an image data from an external device;

(c) an image reproducer which reproduces an image selectively corresponding to the image data produced by the image reader or the image data introduced from the external device; and (d) a corrector which corrects a magnification of an image represented by the image data introduced from the external device.

13. An image forming apparatus comprising:

(a) an image reader which scans an original document line by line in a sub-scanning direction at a predetermined scanning speed and produces an image data according to the original document;

(b) an interface for receiving data from and transmitting data to an external device;

(c) an image reproducer which reproduces an image on a recording medium selectively corresponding to the image data produced by the image reader or the image data received from the external device at a predetermined system speed;

(d) a magnification adjuster for compensating a magnification in the sub-scanning direction of an image represented by the image data produced by the image reader by varying the scanning speed of the image reader;

(e) a detector which detects an amount of magnification compensation effected by the adjuster; and (f) a transmitter for transmitting a data concerning the amount of magnification compensation to the external device trough the interface before receiving the image data from the external device.

14. The apparatus according to claim 13, wherein said adjuster increase the scanning speed of the image reader when the system speed of the reproducer is higher than a standard level, and decreases the scanning speed of the image reader when the system speed of the reproducer is lower than the standard level.

15. The apparatus according to claim 13, wherein said external device corrects the magnification of the image represented by the image data corresponding to the data received from the image forming apparatus before transmitting the image data to the image forming apparatus.

16. The apparatus according to claim 13, wherein said image reader is provided with a CCD line sensor.

17. An image forming apparatus comprising:

(a) an image reader which scans an original document line by line in a sub-scanning direction at a predetermined scanning speed and produces a digital image data according to the original document;

(b) an interface for receiving data from and transmitting data to an external device;

(c) a memory device for selectively storing the digital image data or the digital image data received from the external device;

(d) an image reproducer which reproduces an image on a recording medium corresponding to the digital image data stored in the memory device at a predetermined system speed;

(e) a magnification adjuster for compensating a magnification in the sub-scanning direction of an image represented by the digital image data by varying the scanning speed of the image reader, said adjuster being operable by an operator;

(f) a detector for detecting an amount of magnification compensation effected by the adjuster; and (g) a transmitter for transmitting a data concerning the amount of magnification compensation to the external device trough the interface before receiving the image data from the external device.

18. An image forming apparatus comprising:

(a) an image reader which reads an original document and produces an image data according to the original document;

(b) an interface for receiving data from and transmitting data to an external device;

(c) an image reproducer which reproduced an image selectively corresponding to the image data produced by the image reader or the image data received from the external device; and (d) a transmitter for transmitting a data concerning the magnification to the external device trough the interface before receiving the image data from the external device.

* * * * *